United States Patent [19]

Tanaka et al.

[11] Patent Number: 5,420,804
[45] Date of Patent: May 30, 1995

[54] APPARATUS FOR INPUTTING COORDINATES AND METHOD FOR CORRECTING COORDINATES

[75] Inventors: Atsushi Tanaka; Shinnosuke Taniishi, both of Kawasaki; Yuichiro Yoshimura, Kamakura; Kiyoshi Kaneko, Yokohama; Ryozo Yanagisawa, Matsudo; Katsuyuki Kobayashi; Masaki Tokioka, both of Yokohama, all of Japan

[73] Assignee: Canon Kabushiki Kaisha, Tokyo, Japan

[21] Appl. No.: 940,197

[22] Filed: Sep. 2, 1992

[30] Foreign Application Priority Data

| Sep. 6, 1991 | [JP] | Japan | 3-226788 |
| Sep. 6, 1991 | [JP] | Japan | 3-226789 |
| Jan. 14, 1992 | [JP] | Japan | 4-004564 |

[51] Int. Cl.⁶ .......................................... G06F 15/20
[52] U.S. Cl. .............................. 364/571.01; 178/18; 178/19; 364/560; 364/571.02
[58] Field of Search ............. 178/18, 19; 364/560, 364/571.01, 571.02

[56] References Cited

U.S. PATENT DOCUMENTS

| 4,562,392 | 12/1985 | Davis et al. | 364/474.34 X |
| 4,886,943 | 12/1989 | Suzuki et al. | 178/18 |
| 4,931,965 | 6/1990 | Kaneko et al. | 364/560 |
| 4,952,757 | 8/1990 | Purcell et al. | 178/19 |
| 5,070,325 | 12/1991 | Tanaka et al. | 340/706 |
| 5,352,856 | 10/1994 | Tanaka et al. | 345/177 X |
| 5,362,930 | 11/1994 | Yoshimura et al. | 178/18 |

FOREIGN PATENT DOCUMENTS 0333219  9/1989  European Pat. Off. .

*Primary Examiner*—Edward R. Cosimano
*Attorney, Agent, or Firm*—Fitzpatrick, Cella, Harper & Scinto

[57] ABSTRACT

A coordinate position correcting apparatus includes a setting device for setting in advance a coordinate to be input into a vibration input device, a correction coefficient calculator for calculating a correction coefficient as a ratio of the coordinate set by the setting device to a coordinate output by calculation, and a coordinate corrector for correcting the coordinate output by calculation on the basis of the correction coefficient calculated by the correction coefficient calculator.

16 Claims, 21 Drawing Sheets

TOOL FORCE　LARGE
DISTANCE　　SHORT

TOOL FORCE　MIDDLE
DISTANCE　　MIDDLE

TOOL FORCE　SMALL
DISTANCE　　LONG

APPARATUS FOR INPUTTING COORDINATES AND METHOD FOR CORRECTING COORDINATES

BACKGROUND OF THE INVENTION

1. Field of the Invention

The present invention relates to an apparatus for inputting coordinates. More particularly, the invention relates to the correction of the output in an apparatus for inputting coordinates which calculates coordinates with the propagation delay time of elastic waves.

2. Related Background Art

There have hitherto been proposed coordinate inputting apparatuses using elastic waves as disclosed in U.S. Pat. No. 4,931,965 and others, for example.

Also, there is disclosed in U.S. Pat. No. 5,070,325 an origin correction method for the coordinate inputting apparatus which has the same structure as above. Further, an apparatus has been proposed to make a correction in the coordinate accuracy in accordance with origin correction data.

In the above-mentioned proposal, the operation of the coordinate calculations is performed as given below.

In a coordinate inputting board on which an X sensor pair $S_{XL}\text{-}S_{XR}$ and a Y sensor pair $S_{YU}\text{-}S_{YD}$, each having two sensors as shown in FIG. 6, are arranged to be orthogonal at the coordinate origin 0, a group delay time tgz and a phase delay time tpz at the origin 0 when vibrations are given to a point P positioned at coordinates (x, y) are provided as origin correction data and stored for each of the sensors. Thus, distances between the input point and each of the sensors and the inputted coordinates (x, y) are calculated as follows:

$$N_i = [\{vg(tg_i - tgz_i) - vp(tp_i - tpz_i)\}/\lambda + \alpha] \quad (1)$$

$$D_i = N_i \lambda + vp(tp_i - tpz_i) \quad (2)$$

$$x = (D_l^2 - D_r^2)/2X_{RL} + (D_l - D_r)/2 \quad (3)$$

$$y = (D_u^2 - D_d^2)/2Y_{UD} + (D_u - D_d)/2 \quad (4)$$

where, $tg_i$: group delay time for sensors i
$tp_i$: phase delay time for sensors i
vg: group velocity
vp: phase velocity
$\lambda$: wavelength (=vp/f)
f: frequency
$D_i$: distance between input point and sensors i
$X_{RL}$: distance (SXR−SXL) between x sensors
$Y_{UD}$: distance (SYU−SYD) between y sensors
$\alpha$: time constant integer in [] (0.5 by rounding)

Here, i=l, r, u, and d, which is meant to be the value in each of sensors $S_{XL}$, $S_{XR}$, $S_{YU}$, and $S_{YD}$.

In the above-mentioned conventional example, $N_i$ in equation (1) corresponds to the amount of a deviated wavelength of which the detected phase delay time tp is deviated by a certain wavelength, and it is always an integer. $N_i$ is calculated from the difference between the group delay tg and the phase delay tp as expressed in the equation (1). Therefore, if, for example, the waveform is deformed by an angle at which a vibrating pen is depressed against a vibration transmission member, an offset value is generated due to deviation of the detecting point for the tg, or the like.

FIG. 8 shows such a state as this, indicating the result of actual measurement representing the difference $\Delta N$ between $N_{real}$ arranged into an integer by equation (1) and N already arranged into the integer. Each of lines a, b, c, d, and e corresponds to each of inclinations of pens a, b, c, d, and e shown in FIG. 9. In this result of the measurement, none of them has exceeded the margin for N calculation, i.e., ±0.5. Thus, it is apparent that the normal coordinate calculation is possible. However, in the case of the line a in FIG. 8, for example, $\Delta N$ fluctuates in center of ±0.2. Accordingly, the margin in positive direction is approximately +0.3 which is approximately half +0.5 of the c line. Hence, there is a higher possibility that the accuracy will be lowered due to the fluctuations of the signal level caused by external factors such as noise. Furthermore, in a coordinate inputting apparatus of such kind, the input pen is operated by a person. Usually, therefore the pen is inclined at an angle, not perpendicular, when used. Thus, there is a problem encountered that a sufficient margin cannot be secured.

Also, in the above-mentioned conventional example, the phase velocity Vp can be one of the elements that affect the coordinate accuracy. This velocity Vp is related to the thickness d of a propagation member and a frequency f of vibration and is defined by a function of the product (f×d). Therefore, a fluctuation of the thickness upon manufacturing or a variation of the thickness within the propagating member causes the phase velocity Vp to vary, thus resulting in errors in the computation of the distance between a source of vibration and sensor to lower the coordinate accuracy.

Also, as shown in FIG. 29, the delay time tp is not continuous in relation to the distance. For example, the delay time takes the same value $t_a$ even if distances from the sensors are known such as points at distances $l_1$ and $l_2$. Thus, it is difficult to calculate the Vp just like distance/time at one point of an optional coordinate position. Therefore, for the measurement of the phase velocity, it is necessary to grasp the relation between the delay time tp and the distance from the vibration source quantitatively as shown in FIG. 29. As a result, the delay time must be sampled at a number of points by varying the distance from the sensor. This leads to increasing the number of manufacturing steps, thus increasing the a cost unavoidably.

Also, in the above-mentioned method of calculating coordinates by detecting both the delay time by a group velocity and the delay time by a phase velocity, there occur distance errors (wavelength errors) of units of wavelength in the distance between the vibrating input source and the sensor when the inclination of the pen or the vibrations of constant velocity cause mainly the group velocity to vary. This will reduce the coordinate accuracy significantly.

In this respect, when the generation of errors is detected and then the coordinating output is stopped for preventing the degradation of the accuracy resulting from such generation of the wavelength errors, the interval of sampling the coordinate becomes too wide, thus creating the problem that its useability for an input operation will be reduced.

Also, in the conventional coordinate inputting apparatus of an ultrasonic type, the detected signal waveform of the wave output from the sensor not only changes in amplitude level due to attenuation of the wave by the distance between the vibrating input pen and the sensor, but also depends greatly on the extent of the tool force, strong or weak, of the input pen exerted by an operator. Therefore, when the delay time is detected at a position as a specific position for signal detection where the detecting signal waveform is beyond a certain constant level (the level is required to be more than a certain constant value for distinguishing from any noise), the leading portion of the detected signal waveform cannot be detected. Instead, depending on the detected signal waveform, its second cycle (FIG. 24B) or third cycle (FIG. 24C) are detected eventually, hence resulting in a drawback that the coordinate is erroneously detected. As a method to solve this, it is possible to specify the level of the detected signal waveform electrically, but the number of circuit parts is increased, leading to a new problem that cost is increased significantly after all. In addition, there is a need for reference signal data to determine its amplification factor. Consequently, not all the inputted data can be used for calculating coordinates. In other words, there is a problem that the sampling rate for the coordinate calculation will be lowered. In consideration of these problems, it is necessary for detection of the delay time to adopt a method which does not depend on the amplitude of the detected signal waveform.

In a coordinate inputting apparatus using ultrasonic waves, it is well known that if the wavelength of the elastic wave which is being propagated on a diaphragm is longer than the thickness of the vibration transmission plate, there is propagated a Lamb wave having different group and phase velocities. When this wave is used, the relations between the distance and the arrival delay time can be schematically shown as in FIG. 25, provided that the detection point for the phase delay time is defined at a point above a given level and also envelope peaks of the detected signal waveform are defined to be the respective detection points for the group delay time. The group delay time presents a relation of greater amplitude of fluctuations, and the phase delay time presents a relation of a stepping state although it is continuous. Such relations are caused by the characteristic of the Lamb wave having different phase and group velocities. In this case, any measurement with accuracy is impossible when the distance is calculated by only group delay time. When the distance is calculated by the phase delay time, the relation between the phase delay time and the distance still remains in the stepping state as shown in FIG. 25 even if a level of the detected signal waveform is made constant electrically to prevent an attenuation of the sonic wave and to remove the dependency of the total force. Therefore, when a value $t_0$ is output as a delay time in FIG. 25, there arises a problem it becomes impossible to determine whether the distance is $l_1$ or $l_2$.

SUMMARY OF THE INVENTION

The present invention has been made in consideration of the above-mentioned conventional examples, and the object of the invention is to provide a coordinate inputting apparatus capable of correcting errors in inputted coordinates due to inclination of an input pen so that the coordinates can be calculated more accurately.

It is another object of the present invention to provide a method and an apparatus capable of correcting output coordinate with ease to thereby make it possible to input coordinates with a higher precision, as well as to provide a coordinate inputting apparatus to implement them.

It is still another object of the present invention to provide a coordinate inputting apparatus capable of suppressing generation of wavelength errors without reducing useability in operation.

DETAILED DESCRIPTION OF THE PREFERRED EMBODIMENTS

FIRST EMBODIMENT

Hereinafter, in conjunction with the accompanying drawings, the detailed description will be provided of a first embodiment according to the present invention.

Structure

Figure 1:
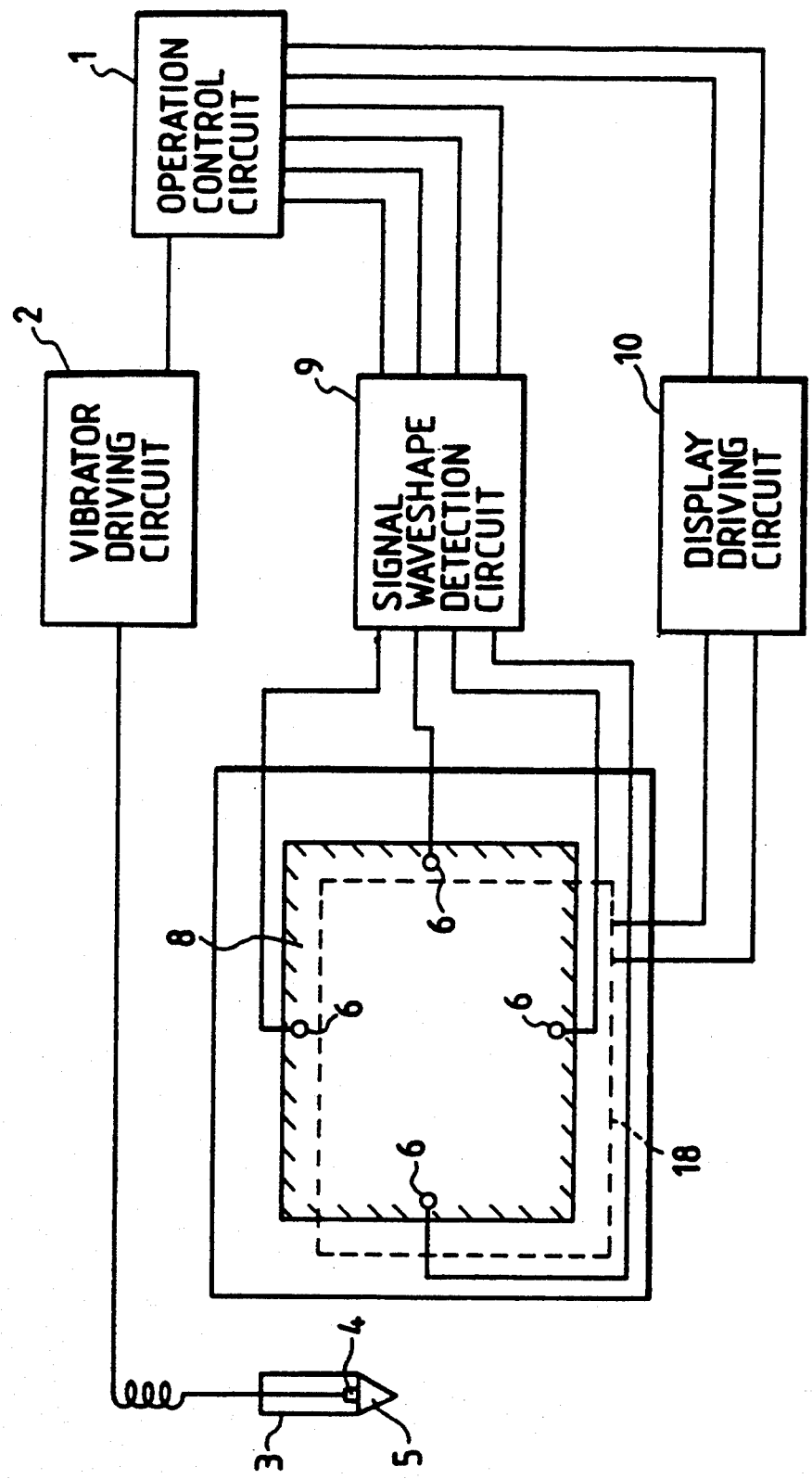
FIG. 1 is a view schematically showing the structure of a first embodiment of a coordinate inputting apparatus according to the present invention.

FIG. 1 is a view schematically showing the structure of a coordinate inputting apparatus adopting the present invention. The coordinate inputting apparatus shown in FIG. 1 constitutes an input and output apparatus for characters, graphics, images, and other information together with a display 18 using a displaying method of a dot matrix type or the like.

In FIG. 1, a reference numeral 8 designates a vibration transmission plate of acrylic resin, glass, or the like to transmit vibrations transmitted from a vibrating pen 3 to four vibration sensors 6 arranged on the periphery thereof. In the coordinate detection using a vibrating pen according to the present embodiment, the coordinate of the vibrating pen 3 on the vibration transmission plate 8 are detected by measuring the transmitting time of ultrasonic vibration transmitted from the vibrating pen 3 to the vibration sensors 6 through the vibration transmission plate 8.

The vibration transmission plate 8 is arranged on a display 18 capable of conducting dot representations such as a CRT (or a liquid crystal display), so that dot representation is given to a position traced by the vibrating pen 3. In other words, the dot representation is executed at the position on the display 18 corresponding to the detected coordinate of the vibrating pen 3, and the images composed of the points, lines, and other elements inputted by the vibrating pen 3 will appear, following the geometric locus of the vibrating pen as if written on a sheet of paper.

Also, according to such structure, a menu display is performed on the display 18. Thus, the items on the menu can be selected by the vibrating pen, or an input method may also be employed so as to display a prompt to enable the vibrating pen 3 to contact with a given position.

The vibrating pen 3 for transmitting ultrasonic vibrations to the vibration transmission plate 8 has a vibrator 4 comprising a piezoelectric element and others therein, and the ultrasonic vibrations generated by the vibrator 4 are transmitted to the vibration transmission plate 8 through a horn portion 5 having a pointed leading end.

Figure 2:
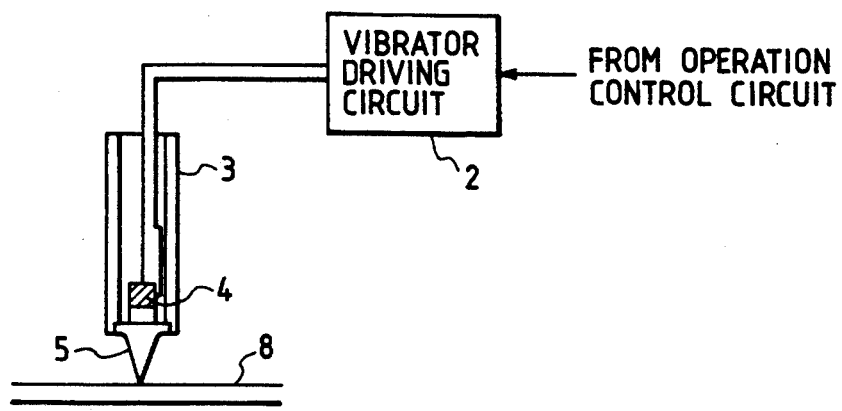
FIG. 2 is a view schematically showing a coordinate input pen according to the first embodiment.

FIG. 2 is a view showing the structure of the vibrating pen 3. The vibrator 4 incorporated in the vibrating pen 3 is driven by a vibrator driving circuit 2. The driving signal for the vibrator 4 is supplied from an operation control circuit 1 in FIG. 1 as a low level pulse signal, and applied to the vibrator 4 after having been amplified with a given gain by the vibrator driving circuit 2 capable of executing low impedance driving.

The electrical driving signal is converted into mechanical ultrasonic vibration by the vibrator 4 and the vibration is transmitted to the vibrating plate 8 through the horn portion 5.

The vibration frequency of the vibrator 4 is selected to be a value in which a Lamb wave can be generated on the vibration transmission plate 8. Also, when the vibrator is driven, a vibration mode is selected so that the vibrator 4 can be vibrated mainly in a direction perpendicular to paper surface of FIG. 2 with respect to the vibration transmission plate 8. Further, it is possible to execute an efficient vibration conversion by making the vibration frequency of the vibrator 4 a resonance frequency of the vibrator 4.

The elastic wave thus transmitted to the vibration transmission plate 8 is a Lamb wave, which has an advantage that it can hardly be affected by a surface flaw or obstacle on the surface of the vibration transmission plate 8 as compared with the surface wave and others.

Now, reverting to FIG. 1, the vibration sensor 6 arranged at the periphery of the vibration transmission plate 8 is also structured with an electromechanical transducer, such as a piezoelectric element. Each of the output signals of the four vibration sensors 6 is inputted into the waveform detection circuit 9 and is converted into a detection signal processable in the operation control circuit 1 arranged in the following state. The operation control circuit 1 executes the measuring process for measuring the vibration transmitting time to detect the coordinate position of the vibrating pen 3 on the vibration transmission plate 8.

The detected coordinate information of the vibrating pen 3 is processed in the operation control circuit 1 in accordance with the output system of the display 18. In other words, the operation control circuit controls the output operation of the display 18 through the display driving circuit 10 on the basis of the coordinate which has been inputted.

Description of Operation Control Circuit

Figure 3:
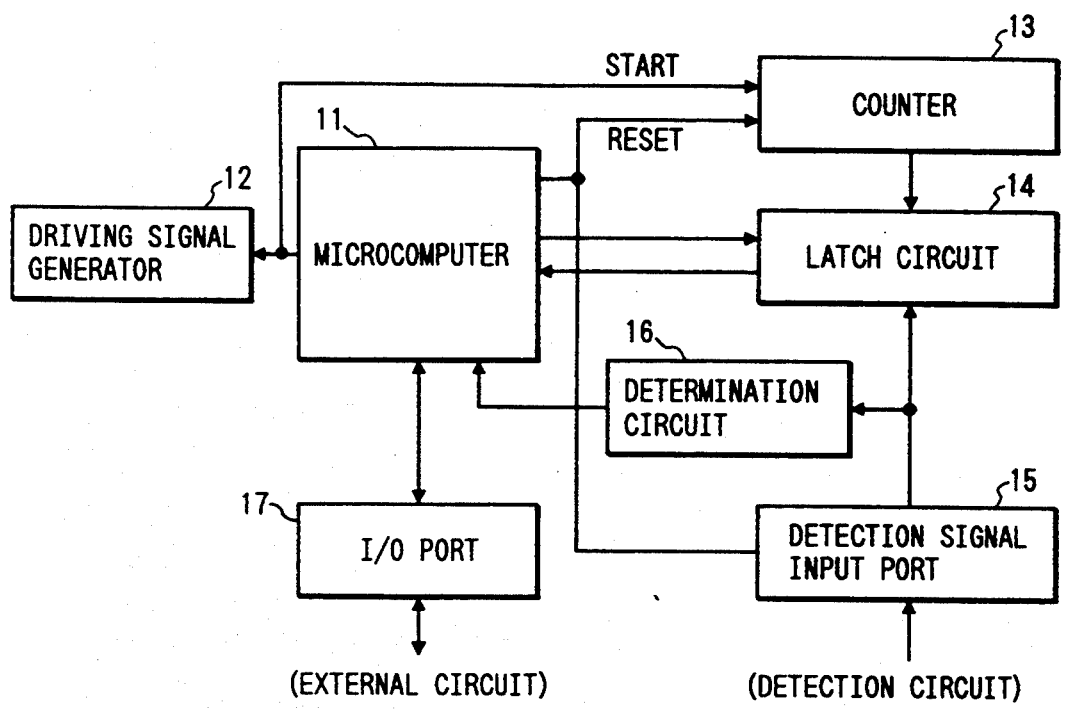
FIG. 3 is a block diagram showing an operation control circuit according to the first embodiment.

FIG. 3 is a diagram showing the structure of the operation control circuit 1 shown in FIG. 1. Here, the structures of the driving system for the vibrating pen 3 and the vibration detecting system for the vibration sensors 6 are mainly shown.

A microcomputer 11 has an inner counter, and a ROM and a RAM incorporated therein. A driving signal generating circuit 12 outputs driving pulses of a given frequency to the vibrator driving circuit 2 shown in FIG. 1. This circuit is actuated by the microcomputer 11 in synchronism with a coordinate calculation circuit.

The counted value of a counter 13 is latched by the microcomputer 11 to a latch circuit 14.

On the other hand, the waveform detection circuit 9 outputs timing information of the detection signal for measuring the vibration transmitting time for coordinate detection in accordance with the output from the vibration sensors 6 as described later. Each timing information is inputted into an input port 15 respectively.

The timing signals from the waveform detection circuit 9 are inputted into the input port 15 and are stored in the storage areas in the latch circuit 14 corresponding to the respective vibratory sensors 6, the results of which are transmitted to the microcomputer 11. In other words, the vibration transmitting time is expressed as a latch value of the output data of the counter 13, and the coordinate operation is executed according to the value of the vibration transmitting time. At this time, a determination circuit 16 determines whether all the timing information from a plurality of the vibration sensors 6 have been inputted or not, and notifies the microcomputer 11 accordingly. The output control process of the display 18 is performed through an input-/output port 17.

Description of Coordinate Calculation

Figure 4:
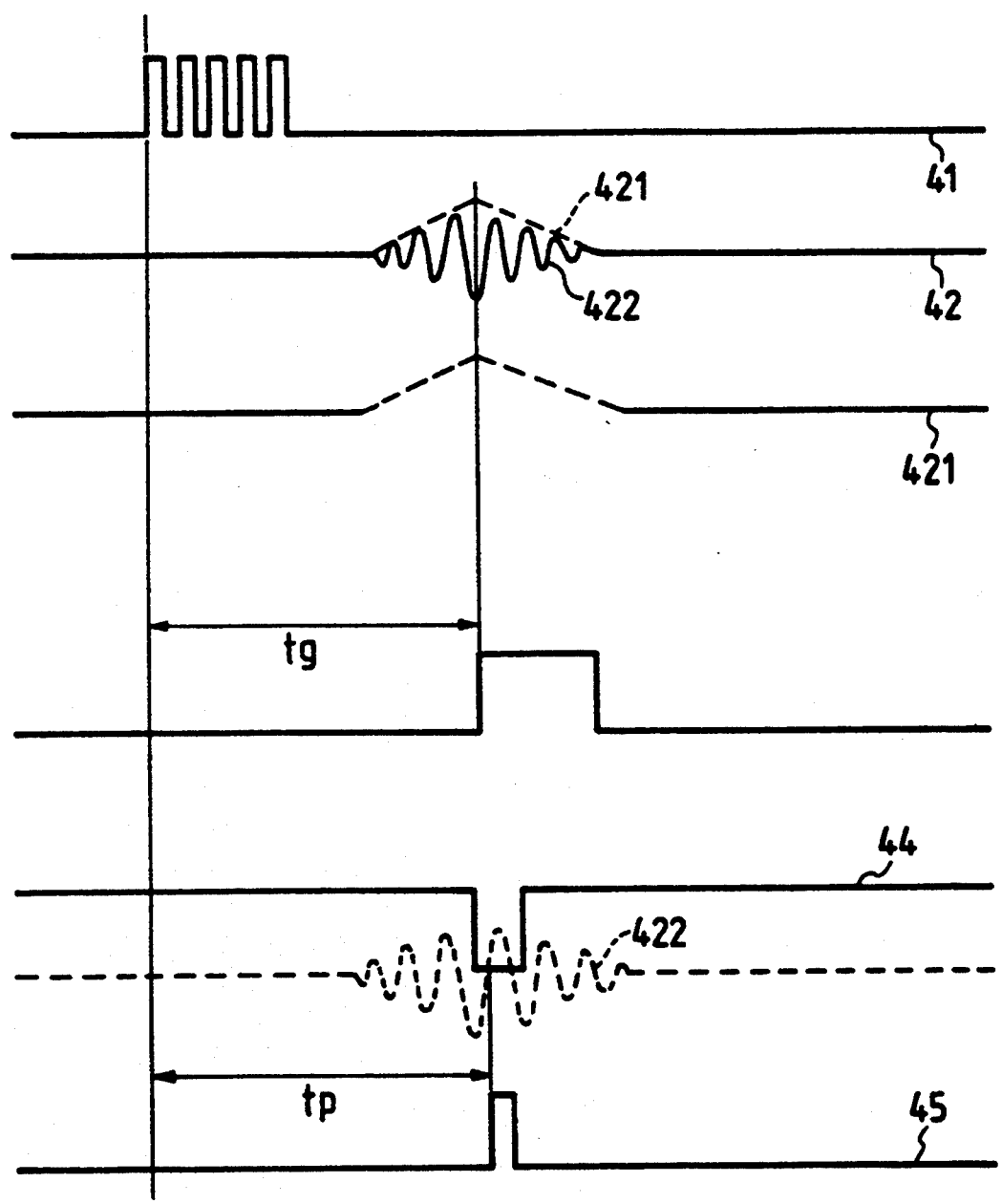
FIG. 4 is a view for explaining states where coordinates are obtainable from propagations of elastic waves.

FIG. 4 is a view illustrating the detection waveforms inputted into the waveform detection circuit 9 shown in FIG. 1 and the measurement processes for measuring the vibration transmitting time on the basis of such waveforms. In FIG. 4, a reference numeral 41 designates a driving pulse to be applied to the vibrating pen 3. The ultrasonic vibration transmitted to the vibration transmission plate 8 from the vibrating pen 3 being driven by such waveform are detected by the vibration sensors 6 through the vibration transmission plate 8.

After the vibration is propagated in the vibration transmission plate 8 with a time tg corresponding to a distance to each vibration sensor 6, it arrives at the sensor 6. In FIG. 4, a reference numeral 42 designates a signal waveform detected by the vibration sensor 6. A Lamb wave used in the present embodiment is a dispersant, and therefore, the relation between the envelope 421 and the phase 422 of the detected waveform varies in accordance with the vibration transmitting distance.

Here, an advancing velocity of the envelope is given as its group velocity Vg, and its phase velocity Vp. With the difference between the group velocity and the phase velocity, it is possible to detect the distance between the vibrating pen 3 and the vibration sensor 6.

Figure 5:
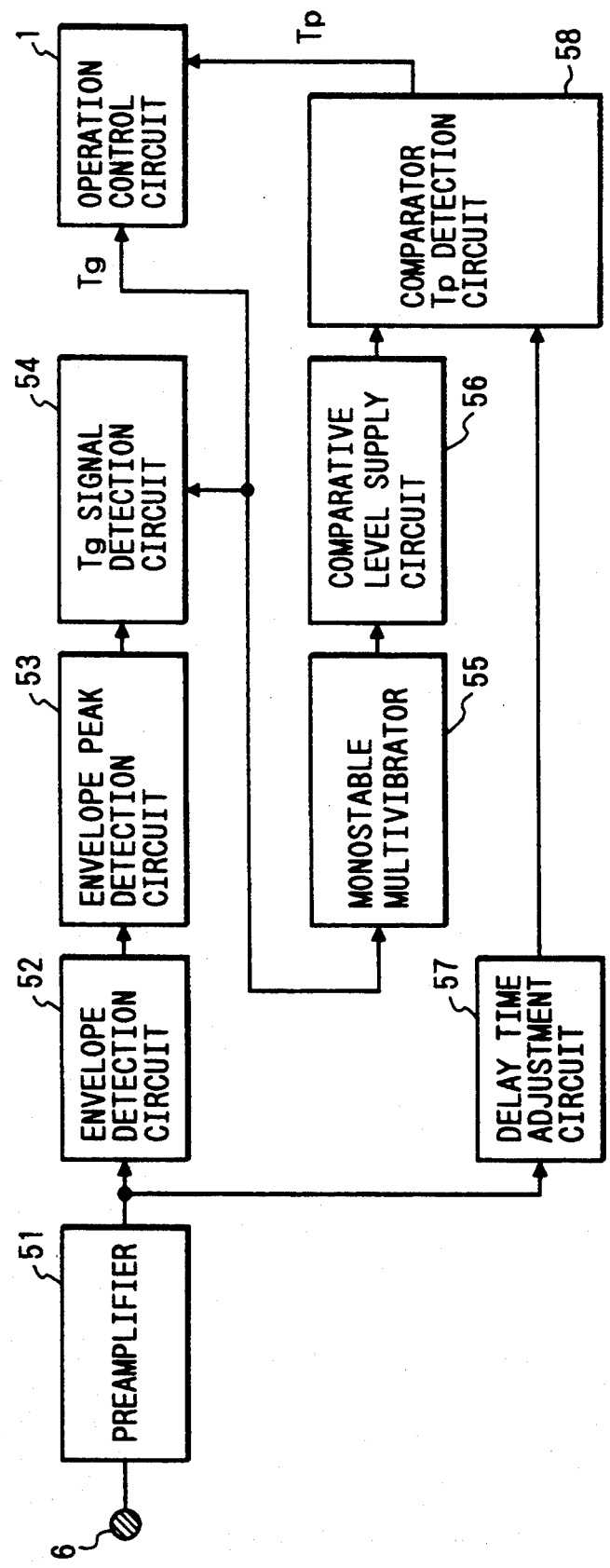
FIG. 5 is a block diagram showing a structure of a waveform detecting circuit.

In order to measure the two vibration transmitting times tg and tp shown in FIG. 3, the waveform detection circuit 9 can be structured as shown in FIG. 5, for example.

In FIG. 5, the output signals of the vibration sensors 6 are amplified to a given level by the amplifying circuit 51.

The amplified signals are inputted into an envelope detection circuit 52 to extract only the envelope of the detection signals. The timing of the envelope peak extracted is detected by an envelope peak detection circuit 53. From the peak detection signal, the envelope delay time detection signal Tg of a given waveform is produced by a signal detection circuit 54 comprising a mono-multi vibrator and others, and is inputted into the operation control circuit 1.

Also, the phase delay time detection signal Tp is produced by a detection circuit 58 in accordance with the timing of this signal Tg and the original signal which has been delayed by a delay time adjustment circuit 57, and is inputted into the operation control circuit 1.

In other words, the Tg signal is converted into a pulse of a given width by a monostable multivibrator 55. Also, a comparative level supply circuit 56 produces a threshold value with which to detect the signal Tp in accordance with this pulse timing. As a result, the comparative level supply circuit 56 produces a signal 44 having the level and timing shown by a reference numeral 44 in FIG. 4, and inputs such signal into the detection circuit 57.

In other words, the monostable multivibrator 55 and the comparative level supply circuit 56 serve to allow the measurement of the phase delay time to be carried out only for a given period subsequent to the envelope peak detection.

This signal is inputted into a detection circuit 58 comprising a comparator and others, and is compared with the detection waveform which has been delayed as shown in FIG. 4. Consequently, a Tp detection pulse such as shown by reference numeral 45 in FIG. 4 is produced.

The circuits set forth above are for one of the sensors 6. The same circuits are also provided for each of other sensors. Now, given the number of the sensors as "h" by generalizing it, each h numbers of the detection signals of the envelope delay times Tg1 to h, and phase delay times Tp1 to h are inputted into the operation control circuit 1, respectively.

In the operation control circuit in FIG. 3, the above-mentioned signals Tg1 to h and Tp1 to h are inputted into the input port 15. Then, drawing each timing, the counted values of the counter 13 are latched into the latch circuit 14, respectively. As described earlier, the counter 13 is started in synchronism with the vibrating pen, thus the data indicating each delay time for the envelope and the phase are latched into the latch circuit 14.

Figure 6:
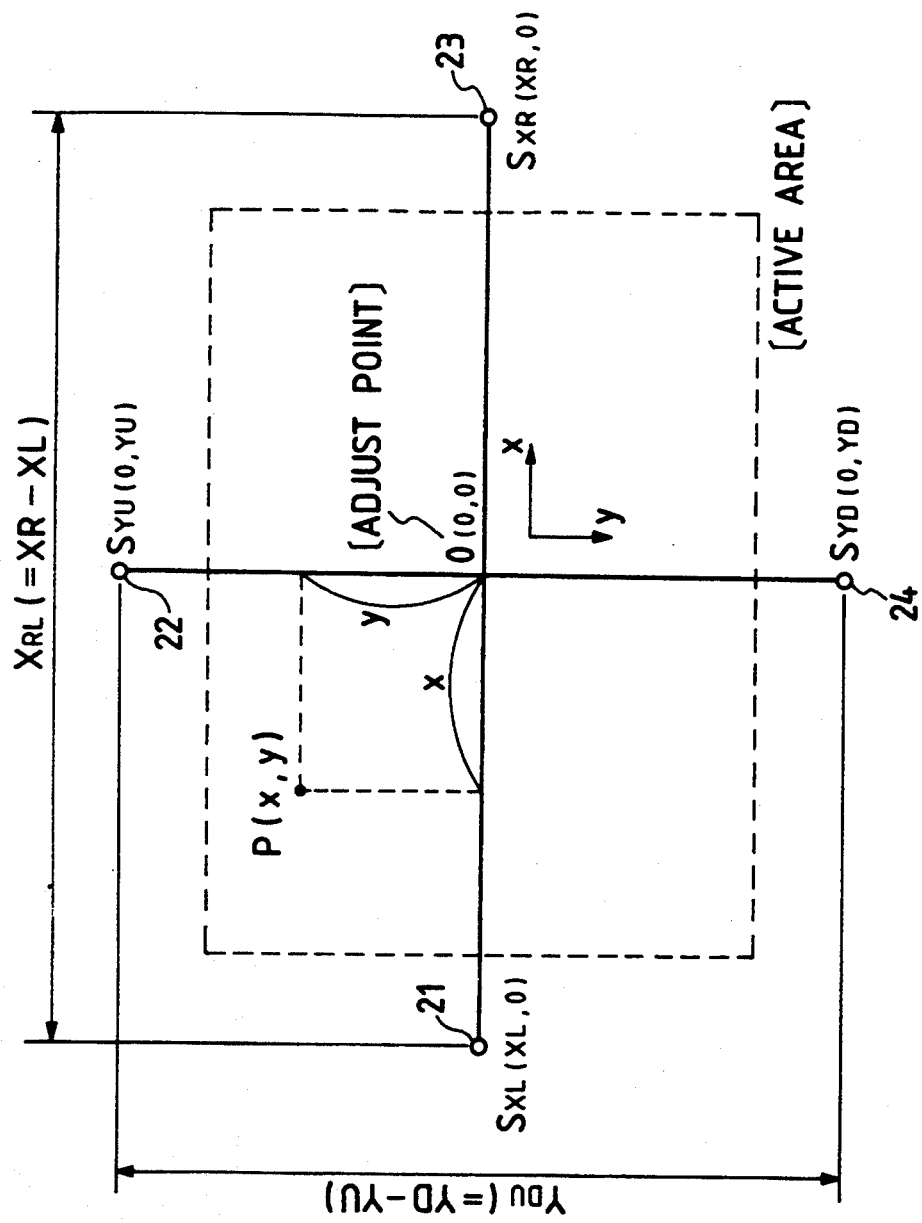
FIG. 6 is an arrangement for vibration sensors according to the first embodiment.

Now, as shown in FIG. 6, four vibration sensors 6 are arranged on the periphery of the vibration transmission plate 8 at the positions indicated by reference marks $S_{XL}$, $S_{XR}$, $S_{YU}$, and $S_{YD}$ (at points 21, 23, 22, and 24, respectively) so that they are positioned on the orthogonal coordinate axes with the center of the vibration transmission plate 8 as origin 0. With the process described in conjunction with FIG. 4, it is possible to obtain straight distances $D_l$, $D_r$, $D_u$, and $D_d$ from the position P of the vibrating pen 3 to each of the vibratory sensors 6. Further, by means of the operation control circuit 1, the coordinate (x, y) of the position P of the vibrating pen 3 can be obtained by the theorem of three squares on the basis of $D_l$, $D_r$, $D_u$, and $D_d$.

Now, by equations (5) to (8) given below, the indicated coordinate (x, y) can be obtained.

$$N_i = [(vg \cdot tg_i - vp \cdot tp_i)/\lambda + \alpha] \tag{5}$$

$$D_1 = vp \cdot tp_i + N_i \lambda \tag{6}$$

$$x = (D_1^2 - D_r^2)/2X_{RL} + (D_1 - D_r)/2 \tag{7}$$

$$y = (D_u^2 - D_d^2)/2Y_{UD} + (D_u - D_d)/2 \tag{8}$$

where, tg$_i$: group delay time for sensors i (origin corrected)
tp$_i$: phase delay time for sensors i (origin corrected)
vg: group velocity
vp: phase velocity
λ: wavelength (=vp/f)
f: frequency
D$_i$: distance between the input point and sensors i
X$_{RL}$: distance (S$_{XR}$−S$_{XL}$) between x sensors
X$_{UD}$: distance (S$_{YU}$−S$_{YD}$) between y sensors
α: time constant integer in [] (0.5 by rounding)

Here, i=1, r, u, and d, which is meant to be the value for each of sensors $S_{XL}$, $S_{XR}$, $S_{YU}$, and $S_{YD}$.

In this way, it is possible to obtain the indicated coordinate (x, y) by the equations (5) to (8). Here, N is a number for correcting a difference between a distance for the group velocity delay and a distance for the phase velocity delay with respect to the calculated distance from the vibration propagating delay times, and is given as an integer. Although N is fundamentally a quantity given as integer, it does not necessarily become an integer only by the first item in [] of the equation (5) due to measurement errors and the like. Therefore, an correcting amount α is added in order to make it a integer. Because of this, the coordinate actually calculated is (x′, y') which mncludes errors in making N an integer. For its simple correction to approximate it to the real coordinate (x, y), the following method is employed:

Errors in Expressing as Integer

From equation (1), the following is derived:

$$N = [\{(vg/vp)tg - tp\}/\lambda + \alpha]; \text{ an integer expressed in } [] \quad (9)$$

$$N_{REAL} = \{(vg/vp)tg - tp\}/\lambda + \alpha \quad (10)$$

Now, since difference between N and $N_{REAL}$ is $\Delta N$, it can be expressed as follows:

$$\Delta N = N_{REAL} - N \quad (11)$$

Assuming that tg and tp in equations (9) and (10) and each of the other parameters are in ideal state without any errors included, the value of $\Delta N$ should become zero. In an actual situation, however, each of the parameters includes an error to cause the value $\Delta N$ to be created.

Figure 8:
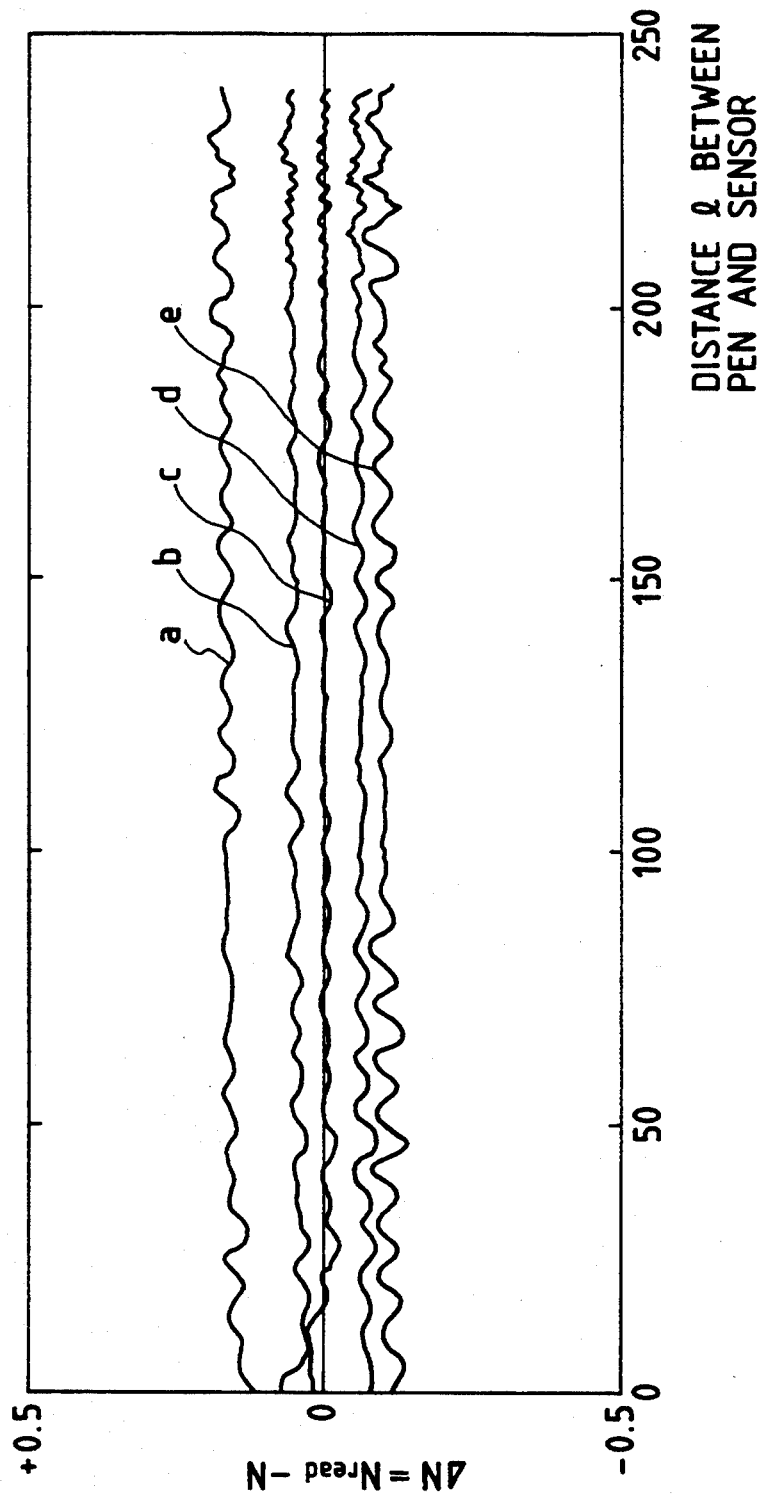
FIG. 8 is a graph showing fluctuations of $\Delta N$ with respect to the angle of a pen.
Figure 9:
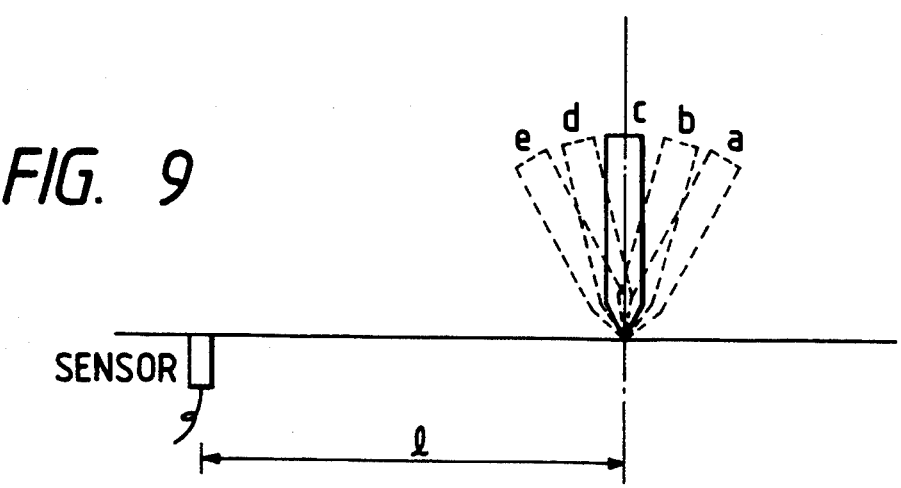
FIG. 9 is a view showing the relationship between the angles of a pen and a sensor.
Figure 10:
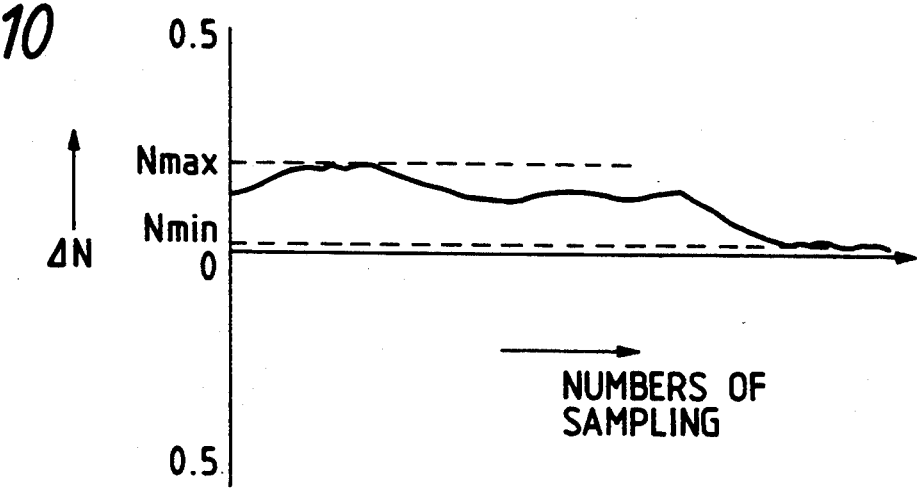
FIG. 10 is a graph showing an example of $\Delta N$ sampling.

Particularly, as described earlier, when the input pen is inclined from its position perpendicular to the coordinate input plate, the fluctuations of the group delay time tg are conspicuous. Such fluctuations will be a major reason for $\Delta N$ variation. FIG. 8 shows the fluctuations of $\Delta N$ with respect to the angle of the pen, while FIG. 9 shows the relationship between the angle of the pen and a sensor. Now, for example, assuming that $\Delta N$ fluctuates by the same width on positive and negative sides of the boundary where the $\Delta N$ variation is zero, it is possible to obtain a correct N value if a treatment is given to provide an integer for N with $\alpha = 0.5$ as expressed in equation (9). In a case of normal use, however, an input pen is often kept within a certain range of inclinations. Therefore, if, for example, the pen input is performed with a certain inclination from its vertical position, the values are deviated to one side only within a range of $\Delta N = +0.2$ to 0 as shown in FIG. 10. In this respect, in order to obtain a maximal margin on both the positive and negative sides, the value of $\alpha$ value should be modified by making the central value of $\Delta N$ fluctuations as zero. In other words, instead of $\alpha$, the following is used for the correction amount:

$$\alpha' = \alpha - \{(\Delta N_{max} - \Delta N_{min})/2 + \Delta N_{min}\} \quad (12)$$

Here, $$(0 \leq \alpha' < 1) \text{ and } (0 \leq \alpha < 1) \quad (13)$$

Figure 11:
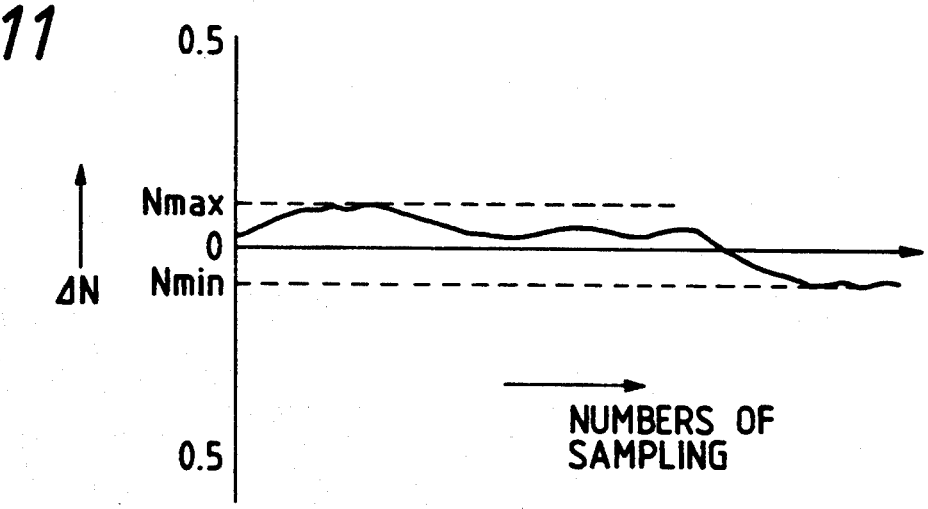
FIG. 11 is a graph showing an example of $\Delta N$ sampling after cyection.

The $\alpha$ can be a value used when $\Delta N$ is calculated. If the margin required for the fluctuation factor of the system itself is not equal to the positive and negative sides, an appropriate value should be established as required and not $\alpha = 0.5$. According to the example shown in FIG. 10, there are arranged $\alpha = 0.5$, $\Delta N_{max} = 0.2$, and $\Delta N_{min} = 0$. Therefore, $\alpha' = 0.4$. This means that the state shown in FIG. 10 has been replaced with the one shown in FIG. 11.

Description of a Flowchart

Figure 7:
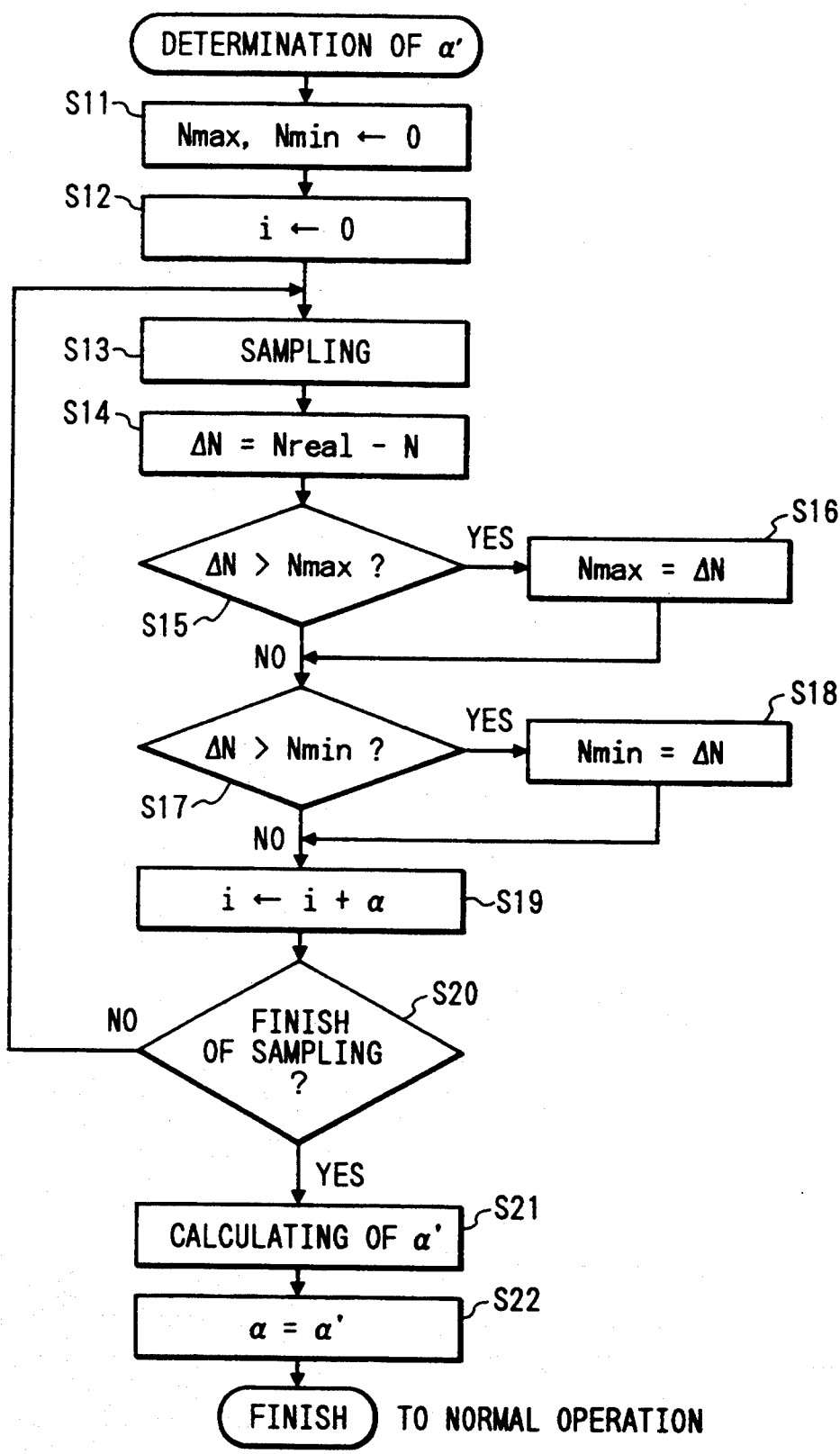
FIG. 7 is a flowchart showing a procedure to determine a correction amount.

FIG. 7 is a flowchart showing the procedure embodying a method for determining a correction amount $\alpha'$ using equation (12).

At first, in steps S11 and S12, variables $N_{max}$ and $N_{min}$ are initialized. A counter i for counting sampling numbers is also cleared. To the variables $N_{max}$ and $N_{min}$, the maximum value and minimum value of $\Delta N$ are assigned, respectively.

Subsequent to the initialization, the sampling is started in step S13. The sampling is executed by selecting the appropriate coordinates, and the coordinates are inputted at such positions. When the coordinates are inputted, the group delay time tg and the phase delay time tp are measured at each of the sensors $S_{XL}$, $S_{XR}$, $S_{YU}$, and $S_{YD}$ arranged at the edges of the vibration transmission plate.

In step S14, the $\Delta N$ is obtained by the equations (9), (10), and (11) using the measured values tp and tg. Here, the values vp, vg, and $\lambda$ are assumed to have been known.

In step S15, whether obtained $\Delta N$ is greater than the current value of $N_{max}$ or not is determined. If it is found to be greater, $\Delta N$ is assigned to $N_{max}$ (step S16). If not, the method proceeds to Step S17, where whether $\Delta N$ is smaller than $N_{min}$ or not is determined, and if it is found to be smaller, the value thus found is assigned to the $N_{min}$ (step S18).

If it is found larger in Step S17, when one sampling data is processed, the counter i for counting the sampling numbers is incremented by 1 in step S19 and then in step S20, whether the value of the counter i is arrived at a given sampling number or not is determined. If the value is not arrived at it as yet, the process will return to the step S13 to execute the processing of another sampling data. When the sampling is terminated, an $\alpha'$ is defined in step S21 by the equation (12) using the minimum and maximum $\Delta N$s hitherto obtained. Thus, thereafter, the coordinate calculation will be performed with this $\alpha'$ as $\alpha$ (step S22).

With the procedures set forth above, it is possible to obtain a correction amount $\alpha$ required for calculating the coordinate as a value thereby to enable the coordinate calculation to be executed more accurately.

In this respect, the sampling numbers in the above-mentioned procedures are arbitrary. The numbers can be set to obtain a desired accuracy. Also, in the present embodiment, the sampling period is regulated by the sampling numbers, but it may be possible to regulate it by time or other means.

As an example of operational procedures to execute samplings according to the above-mentioned flowchart, a description will be provided of a case where it is done by a user himself.

At first, subsequent to the power source having been turned on, switching over to the mode to determine the correction amount $\alpha$ is conducted at an appropriate time by a switch or a mode switching over means such as menu or icon using software. In this mode, $\alpha'$ is determined using the procedures in accordance with the above-mentioned flowchart. At this juncture, appropriate characters or graphics are written on the coordinate input plate by the user freehand or according to a format prepared in advance. As sampling data, a date, various figures (circle, square, and the like) or many other patterns are inputted, for example. Thus, the value of $\alpha'$ can be obtained in a better condition.

With the sampling conducted with a method such as this, it is possible to maintain a correction amount $\alpha$ in a state closer to the operational environment desired by a user and to provide a coordinate inputting apparatus having a stabilized higher precision with a wider margin for errors. Also, if the obtained correction amount $\alpha$ is stored in a non-volatile memory (such as EEPROM) or the like, it becomes unnecessary to execute the sampling as described above, thus, thereafter reducing the work load on the part of the user.

In this respect, the mode for determining a correction amount $\alpha'$ by calculating $\Delta N$ is actuated by explicitly instructing it in the first embodiment, it may be possible to do this during the operation of a normal coordinate input without causing a user to select this mode. In other words, $\Delta N$ is calculated at each time the coordinates are normally inputted, and whenever the samplings are accumulated to a given number, a correction amount $\alpha$ is calculated to update its value. If the structure is arranged in such a manner it is possible to correct the coordinate calculation without any sampling operation executed by a user. Moreover, since $\Delta N$ is frequently calculated like this, it becomes possible to determine the adequateness of the calculated coordinate values. In other words, when the inputted coordinates are calculated, its $\Delta N$ for each of the sensors is calculated. Now, supposing that this $\Delta N$ value is the one close to $\pm 0.5$, that is, the margin is close to zero, it can be determined that there is a high possibility that this data will bring about errors in any coordinated values obtained. Thus, if a $\Delta N$ which exceeds a predetermined $\pm N_{th}$ threshold value is calculated, it is possible to eliminate any erroneous output by nullifying the coordinate value inputted at that time.

In this case, the value of the $\pm N_{th}$ threshold value may be determined by the maximum values and minimum values of $\Delta N$ samplings to be conducted at the time of delivery, for example. Also, it may be possible to determine the threshold value using a statistical technique for the sampled data groups within a range of integral times the standard deviations with its mean value as the central value, for example. Also, it may be possible to define the threshold value specifically as a constant without making any individual determination for each mechanical body of the apparatuses.

In this respect, the present invention is applicable not only to an apparatus comprising a plurality of pieces of equipment, but also to an apparatus having a single piece of equipment. The present invention is, of course, applicable to a case where a system or an apparatus is operative when a program is supplied thereto.

As described above, a coordinate inputting apparatus according to the first embodiment of the present invention is capable of correcting errors in the inputted coordinates due to the inclination of the input pen and calculating the coordinates more accurately.

Second Embodiment

Figure 12:
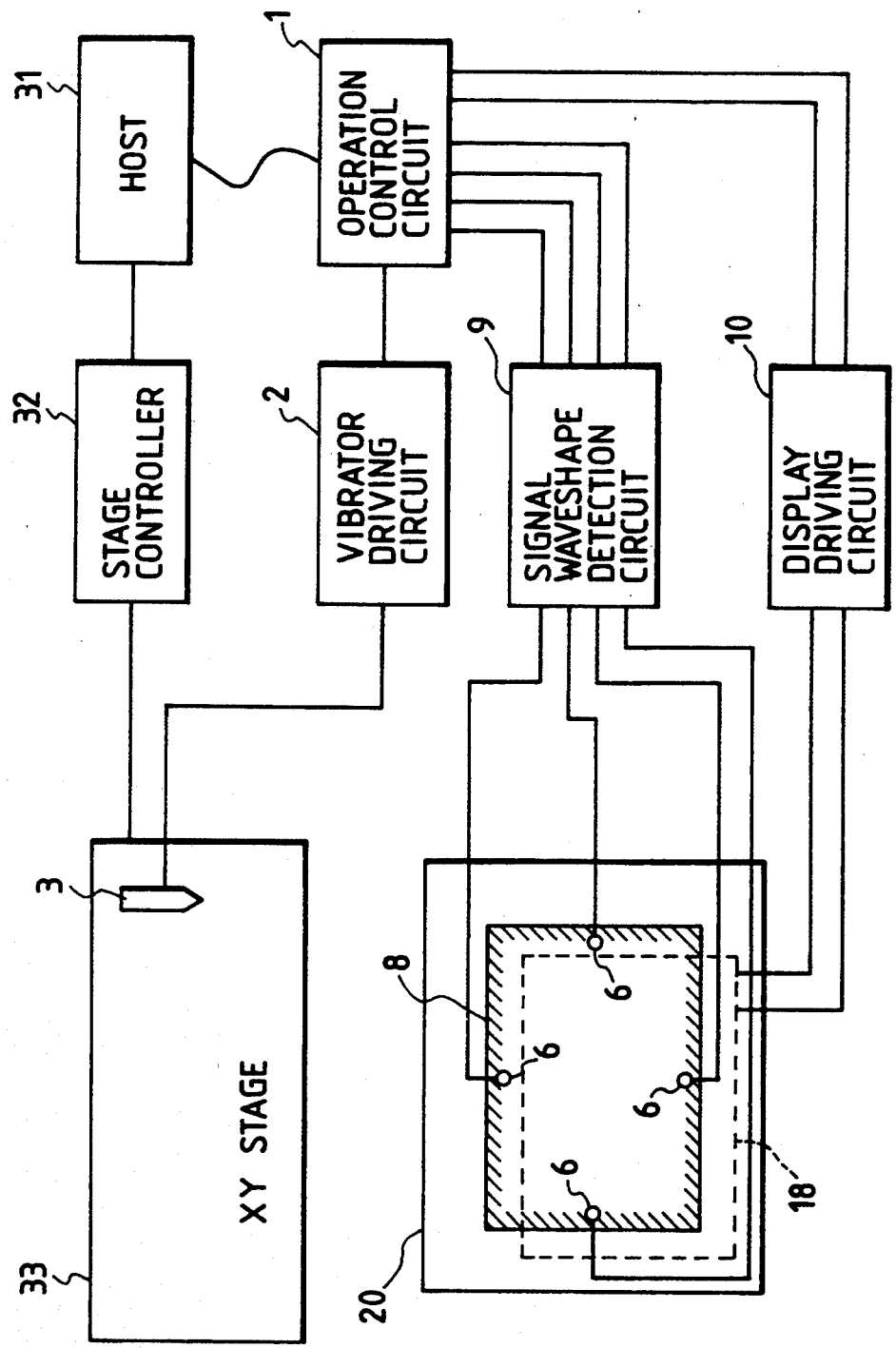
FIG. 12 is a view schematically showing a structure of a second embodiment of a coordinate inputting apparatus according to the present invention.

FIG. 12 is a view showing the structure of a second embodiment of a coordinate inputting apparatus according to the present invention.

The structure of the main body of the coordinate inputting apparatus is the same as the first embodiment shown in FIG. 1. Because the descriptions of the operation control circuit and the coordinate calculation are duplicated, these descriptions will be omitted.

Figure 14:
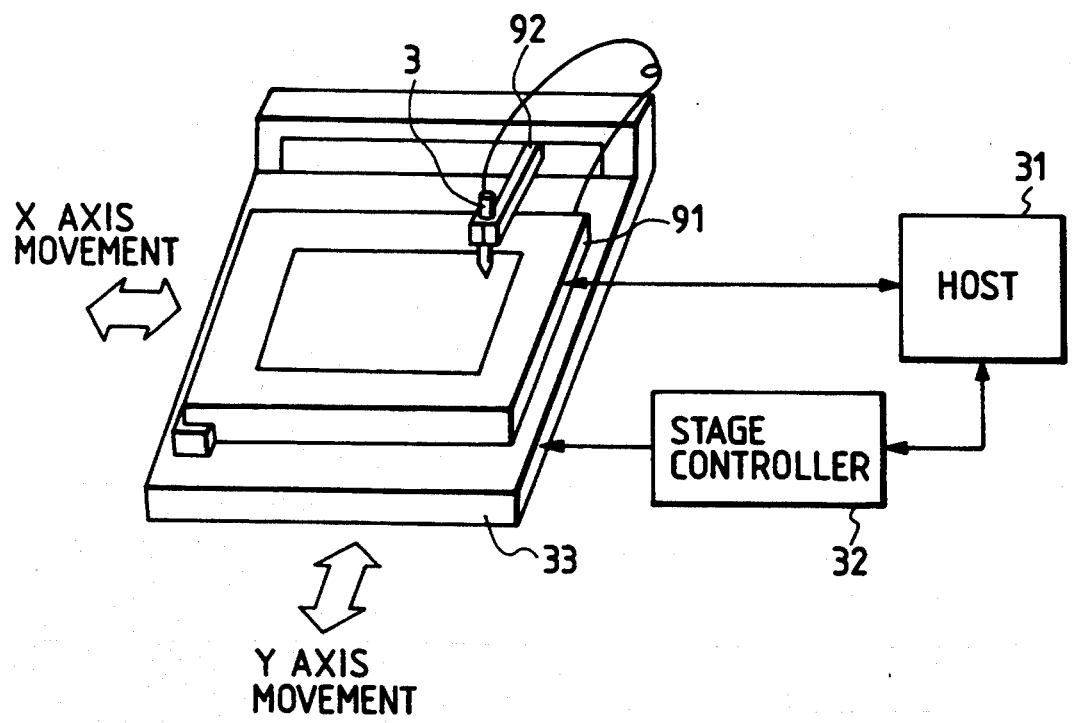
FIG. 14 is a view showing an external appearance of a sampling apparatus.

What differs from the first embodiment is that in addition to the main body of the coordinate inputting apparatus, an X-Y stage is connected for inputting the coordinates which are known in advance in order to correct the coordinates to be output. The X-Y stage 33 is one to cause the coordinate positions specified by a vibrating pen 3 to be indicated, and when a host 31 indicates coordinates, a stage controller 32 determines an amount for the vibrating pen 3 to move. Then, the X-Y stage 33, having received such as indication, allows the vibrating pen to move to a new position. In this respect, the host 31 is connected to the coordinate inputting apparatus through communication lines to transmit and receive data. FIG. 14 is a view showing the appearance of a coordinate inputting apparatus to which an X-Y stage is connected. A reference numeral 91 designates the main body of the Coordinate inputting apparatus; 3 denotes a vibrating pen for input which is connected to an arm 92; and 33 denotes the X-Y stage movable in the directions of the X axis and Y axis which are orthogonal to each other and is controlled by the host 31 through the controller 32, thus being movable to specified positions.

As described in the first embodiment, the indicated coordinates (x, y) can be obtained by the above-mentioned equations (5) to (8), but the values actually calculated are (x', y') which include errors due to the fluctuation of the phase velocity Vp. In order to correct this simply, a method is used in the second embodiment as given below.

Method for Correctiong Coordinate

Now, in the equation (7) for calculating coordinate, Vp is separated by defining the propagation delay times for the sensors $S_{XL}$ and $S_{XR}$ as $t_1$ and $t_r$ and then it can be expressed as follows.

$$x = vp^2 \cdot (t_1^2 - t_r^2)/2X_{RL} + vp \cdot (t_1 - t_r)/2 \qquad (14)$$

Likewise, the equation (8) will be:

$$y = vp^2 \cdot (t_u^2 - t_d^2)/2Y_{UD} + vp \cdot (t_u - t_d)/2 \qquad (14)$$

Where $t_u$ and $t_d$ are the delay times for sensors $S_{YU}$ and $S_{YD}$.

Here, $$t_i = (tp_i - tpz_i) + h_i \tau$$

$$\tau = \lambda/Vp = 1/f$$

Where i = 1, r, u, and d.

Now, the coordinate of a point P' that the apparatus outputs when the point P (x, y) is indicated is given as (x', y'). In this case, given the phase velocity used for the calculation as Vp', the coordinates (x' and y') are obtained by the following equations:

$$x' = vp'^2 \cdot (t_1^2 - t_r^2)/2X_{RL} + vp' \cdot (t_1 - t_r)/2 \qquad (16)$$

$$y' = vp'^2 \cdot (t_u^2 - r_d^2)/2Y_{UD} + vp' \cdot (t_u - t_d)/2 \qquad (17)$$

Here, if the $Vp' = Vp \cdot K$, the ratio between x and x' will be:

$$\begin{aligned} x/x' &= (a \cdot vp^2 + b \cdot vp)/(a \cdot vp^2 \cdot K^2 + b \cdot vp \cdot K) \\ &= 1/K \cdot \{(a \cdot vp + b)/(a \cdot vp \cdot K + b)\} \end{aligned} \qquad (18)$$

However, a is defined as follows:

$$a = (t_1^2 - t_r^{26l})/2X_{RL}, \, b = (t_1 - t_r)/2 \qquad (19)$$

Here, if $K = (1 + \Delta K)$, $$\begin{aligned} x/x' &= 1/K \cdot \{1 + \Delta K \cdot a \cdot vp/(a \cdot vp + b)\}^{-1} \\ &= 1/K \cdot \{1 + \Delta K \cdot (t_1 + t_r)/(t_1 + t_r + X_{RL})\}^{-1} \end{aligned} \qquad (20)$$

Therefore, the second item on the right-hand side will be zero provided that $t_1 = -t_r$. Also, if the usual thickness variation of the plate is $\pm 0.05$ (mm), the velocity variation should be approximately 1.5%. Hence, $\Delta K < 0.015$. Therefore, it can be expressed by the equation (20) as follows.

$$x/x' \cong 1/K \quad (21)$$

In other words, the variation of the phase velocity Vp is absorbed by multiplying the output coordinate value $x'$ by a correction coefficient $1/K$, thus making is possible to calculate accurate coordinates.

In the same way, the ratio between y and $y'$ is obtained as follows:

$$y/y' = 1/K \cdot \{1 + \Delta K \cdot (t_u + t_d)/(t_u + t_d + Y_{UD})\}^{-1} \quad (22)$$

Then, $$y/y' \cong 1/K \quad (23)$$

can be derived.

As described above, in the coordinate system at the adjustment point (origin) shown in FIG. 1, the output coordinate for the coordinate position including the extreme edges of the effective area is sampled by the equations (21) and (23), and then it is clear that the correction coefficient $1/K$ can be determined by calculating the average of the ratios $(x/x')$ and $(y/y')$. In this respect, as clear from the equations (21) and (23), the point where coordinate position (denominator) becomes zero is removed because the calculation is disabled.

In order to implement this, the output coordinate is sampled using the X-Y stage.

Figure 13:
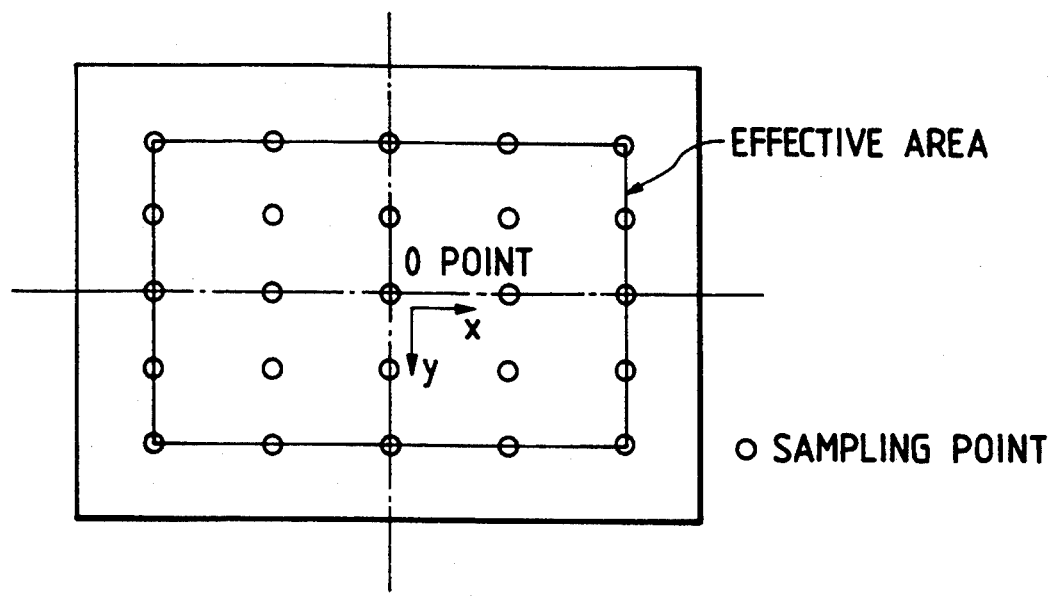
FIG. 13 is a view showing an example of sampling for correction.

At first, the coordinate (x, y) is specified by the host 31 to the stage controller 32. Here, the specified coordinate is given as values with the center of the coordinate inputting apparatus as the origin (zero adjustment point: refer to FIG. 6). The positions represented by small circles (sampling points) in FIG. 13 are specified as such coordinate $(X_i, Y_i)$, and then the coordinate $(X_i', Y_i')$ calculated after being inputted by the vibrating pen 3 is obtained from the main body of a coordinate inputting apparatus 91. The host 31 has already transmitted the specified coordinate $(X_i, Y_i)$ to the main body of the coordinate inputting apparatus 91. In the operation control circuit 1 in the main body 91 obtains a correction constant $K_i$ by applying the equations (21) and (23) using the transmitted values together with the calculated coordinate $(X_i', Y_i')$.

The above-mentioned process is executed at various coordinate positions plural times. For example, it is performed at each of the sampling points in FIG. 13. The values $K_i$ thus obtained are all averaged to be the correction constant K. The correction constant K thus obtained may be stored in a memory or the like in the operation control circuit 1. In this respect, it is impossible for the usual coordinate input to conduct the sampling at the coordinate positions for the K calculations. It is thus particularly necessary to provide an input mode for calculating correction data.

Once the correction constant K is given in this way, the X-Y stage 33 and the host 31 can be removed from the main body 91. Then, the system can be used as a usual coordinate inputting apparatus. In other words, a coordinate inputting apparatus according to the present embodiment outputs the following coordinate (x, y) from the coordinate (x', y') calculated by the equations (16) and (17):

$$x = x'/K \quad (24)$$

$$y = y'/K \quad (25)$$

Figure 15:
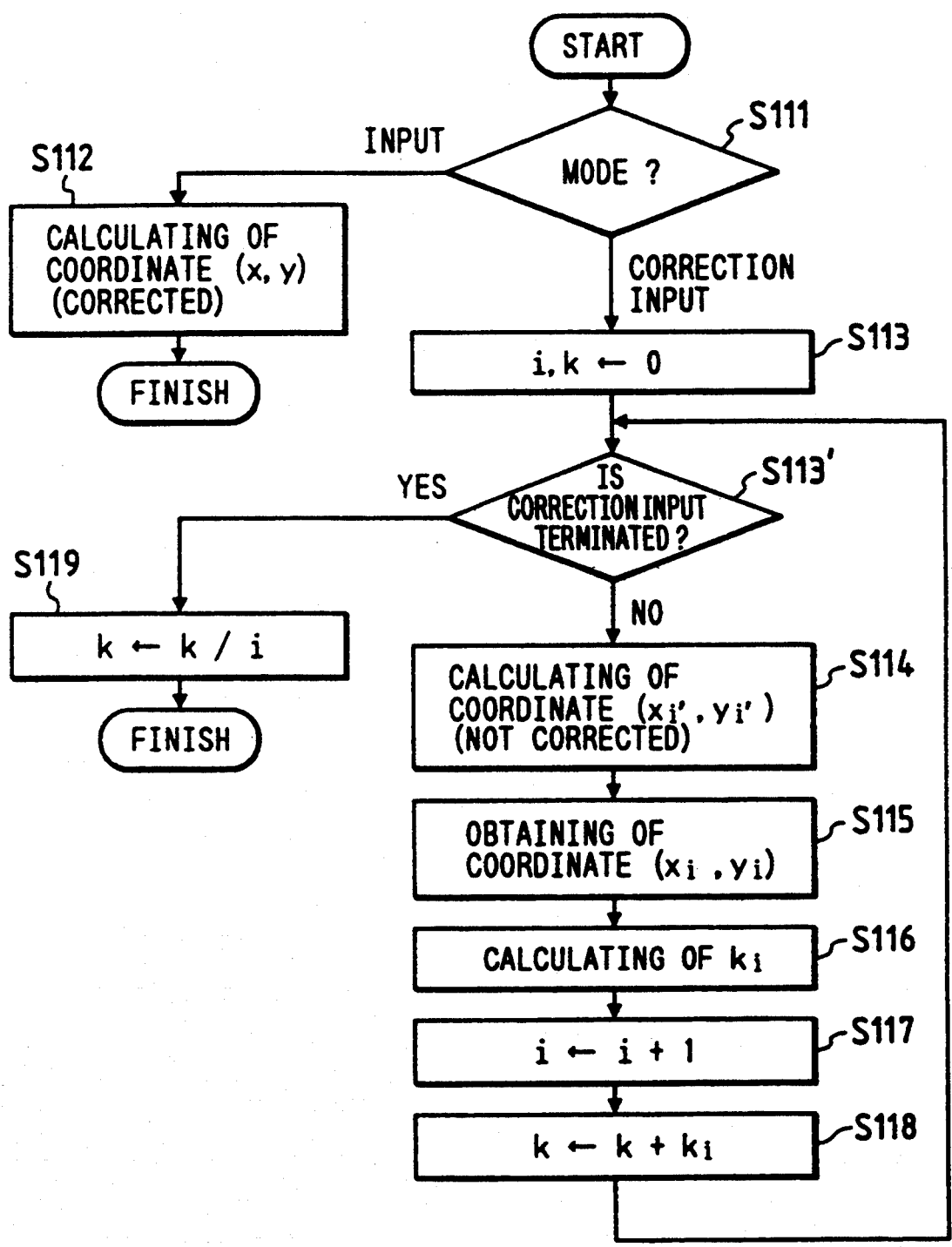
FIG. 15 is a flowchart showing the input of a coordinate and the correcting of the input by the use of an operation control circuit.

The above-mentioned procedures will be described together as a flowchart in FIG. 15. The procedures represented by this flowchart are executed by the operation control circuit 1 provided for the coordinate inputting apparatus.

At first, when coordinates are inputted, the current input mode is examined (S111). The input mode is specified by a personal computer or other controlling equipment connected to a coordinate inputting apparatus according to the present embodiment or specified by switches or others provided for the main body of the coordinate inputting apparatus.

In the usual input mode, the coordinate is calculated by the vibration delay times, and corrected values are output (S112). The correction is made by the equations (24) and (25) using the correction constant K defined by the correction input mode.

In the correction input mode, the variables i and K for the use of calculations are initialized at first (S113), then whether the correction input is revised or not is tested (S113'). If not revised, coordinate $(x_i', Y_i')$ is calculated. For this, the equations (16) and (17) are used (S114). Meanwhile, in this case, the inputted coordinate has already been known. Therefore, such coordinate $(x_i, y_i)$ is obtained from the host 11 of the X-Y state (S115).

From the coordinate $(x_i', y_i')$ and $(x_i, Y_i)$ thus obtained, the correction constant $K_i$ is calculated using the equations (21) and (23). Since two values, $(x_i'/x_i)$ and $(y_i'/y_i)$, are obtained from one coordinates, its mean value is adopted as $K_i$ (S116).

When $K_i$ has been calculated, the sampling number i is incremented by 1 (S117), and $K_i$ is accumulated on K (S118). Thereafter, the process will return to the step S113' and the procedures are repeated beginning with the step in which it is tested whether the correction input has been terminated or not.

On the other hand, if such input is found to be terminated in the step S113, the accumulation K of $K_i$s is divided by the sampling number i to obtain its average. The value thus obtained is stored in a memory as a correction constant (S119).

When the correction constant K has been calculated according to the above-mentioned procedures, it becomes possible to execute the coordinate correction using K.

Also, in the second embodiment, while the correction constant K is calculated in the main body of the coordinate inputting apparatus, it may be possible for the host 31 to read output (x', y') of the main body 91 of the coordinate inputting apparatus on the contrary and calculate the correction constant K which will be transmitted to the main body of the coordinate inputting apparatus. In this case, the procedures shown in the flowchart in FIG. 15 can still be executed by the host 31 as they are. However, in the step S114 the coordinate $(x_i', y_i')$ must be read from the main body of the coordinate inputting apparatus while in the step S115, it becomes unnecessary to fetch the coordinate $(x_i, y_i)$. Also, in the step S119, the obtained K value must be transmitted to the main body of the coordinate inputting apparatus and stored in a memory.

In this respect, according to the above-mentioned second embodiment, another apparatus is externally connected to the coordinate inputting apparatus to obtain and calculate correction data, but it may be possible to do these in the main body of the coordinate inputting apparatus.

Figure 16:
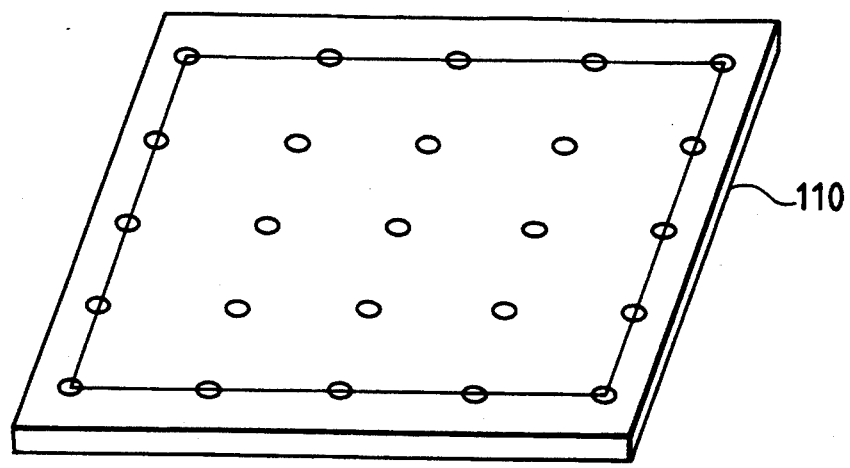
FIG. 16 is a view showing a sampling template.

For example, a template 110 as shown in FIG. 16 is prepared. Using it as a jig which supports each input at a given position, the sampling input operations are executed. The template 110 is of the same size of the coordinate inputting area. With the aid of the holes provided at appropriate positions, the indications can be made with the input pen through such holes.

At first, a mode is switched over by a menu selection or switching to the correction input mode, and the template is set at a fiducial position on the coordinate inputting area. At this juncture, it may be possible to set the template with the exterior of the main body of the coordinate inputting apparatus as reference, or if it is a type integrally built with a display, it may be possible to display a cross-line type or some other fiducial marks for setting on the image formation surface. Then, setting the template for sampling inputs, the calculations are performed by the equations (21) and (23) using the coordinate data calculated at that time and the positions of the holes on the template which are given in advance, or coordinate values, hence adopting the average of the results of these calculations as in the case of the aforesaid conventional example.

Figure 17:
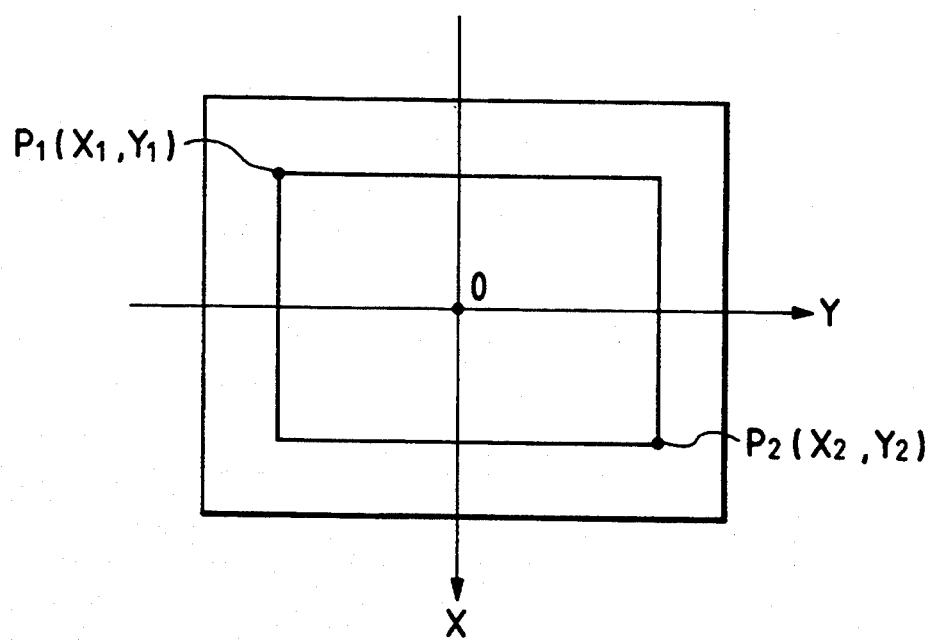
FIG. 17 is a view showing an example of sampling technique.

Further, in order to execute the correcting operation simply, the original coordinate at the point $P_1$ in FIG. 17 and the coordinate obtained by the equations (16) and (17) without any corrections are given as $(X_1, Y_1)$ and $(X_1', Y_1')$ and the point $P_2$ is also given as $(X_2, Y_2)$ and $(X_2', Y_2')$, respectively. Then, by the equation (21), the following will result:

$$(X_1-X_2)/(X_1'-X_2')=1/K \qquad (26)$$

$$(Y_1-Y_2)/(Y_1'-Y_2')=1/K \qquad (27)$$

Thus, it suffices only if the difference between the two points has been known.

In other words, the two points, $P_1$ and $P_2$, shown in FIG. 17 are sampled using a template capable of covering such two points. Then, it may be possible to determine K by the equations (26) and (27) using the difference between them. Also, it may be possible to use a template having hole positions regulated with cycles of predetermined intervals thereby to conduct inputs sequentially per row from the starting point. Then, calculations are performed on the basis of the difference between the coordinates adjacent to each other. When the number of holes per row or the difference between given data is found to be above the fiducial value (two times $X_1-X_2$, for example), it is considered that the rows are to be changed, and the rows can be changed just by conducting recalculation between the adjacent points themselves.

Also, when the required precision is not very high or in similar cases, it may be possible to display or indicate input points on the display or the effective area, thus enabling the user or others to specify such points using the pen to execute operations in the same manner for the calculation of the correction coefficient.

In the above-mentioned second embodiment, the correction is made by multiplying the calculating coordinate by the correction coefficient 1/K, but it may also be possible to work out a Vp' from the definition of Vp'=Vp . K and to store this value thereby to execute the coordinate calculation.

Also, a tg is detected to enable it to serve as vg dually.

As described above, a coordinate inputting apparatus according to the second embodiment of the present invention is capable of correcting the outputting coordinates with ease, hence providing a method for correcting coordinate positions, which enables coordinate inputs to be performed with high precisions, as well as a coordinate inputting apparatus capable of implementing such a method.

THIRD EMBODIMENT

Hereinafter, in conjunction with the accompanying drawings, a description will be provided of a coordinate inputting apparatus according to a third embodiment of the present invention.

In this respect, when describing the structures, the same reference numerals are applied to the same constituents appearing in the first embodiment.

Structure

Figure 18:
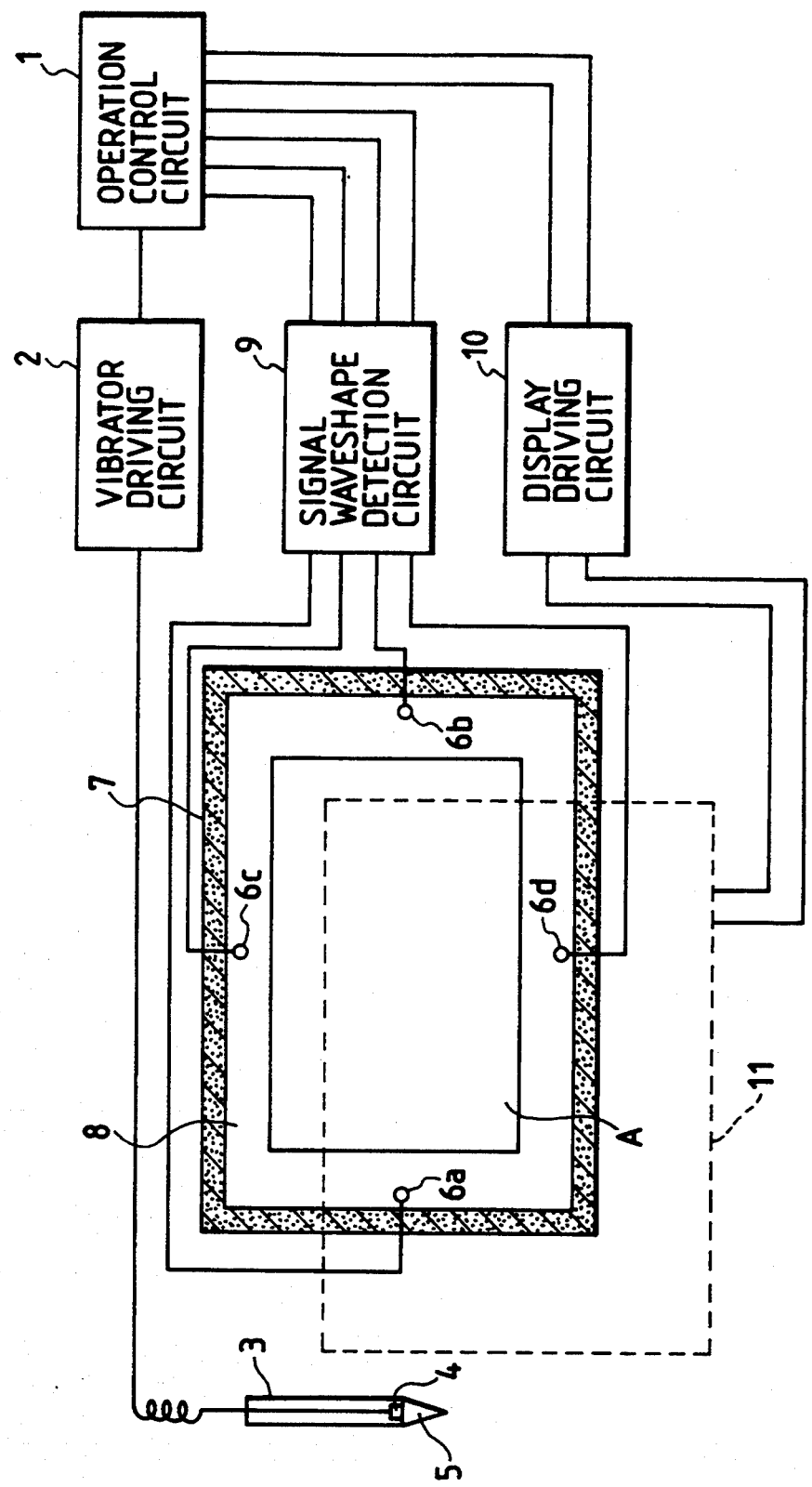
FIG. 18 is a block diagram showing a structure of a coordinate inputting apparatus of a third embodiment according to the present invention.

FIG. 18 shows the structure of a coordinate inputting apparatus according to a third embodiment of the present invention. In FIG. 18, a reference numeral 1 designates an operation control circuit which controls the entire system of the apparatus as well as calculates the coordinate positions; 2 denotes a vibrator circuit to drive the tip of the pen in a vibrating pen 3; and 8 denotes a vibration transmitting diaphragm made of a transparent material such as acrylic resin or glass, and the coordinate input by the vibrating pen 3 is performed by allowing it to touch the surface of the vibration transmitting diaphragm 8. In practice, it is done by specifying the locations with the vibrating pen 3 within the area at a reference mark A indicated by solid line in FIG. 18 (hereinafter, referred to as effective area). Then, on the periphery of this vibration transmission plate 8, an anti-vibration material 7 is provided to prevent (reduce) the rebounding vibration from being returned to the central part, and on the boundary portion therebetween there are fixed the vibratory sensors 6a to 6d which transduce mechanical vibrations to electrical signals such as piezoelectric elements.

A reference numeral 9 designates a signal waveform circuit for outputting the vibration signals detected by the respective sensors 6a to 6d to the operation control circuit 1, and 11 denotes a display capable of performing displays. per dot unit for a liquid crystal display or the like, which is arranged behind the vibration transmitting diaphragm, thus displaying dots at the positions traced by the vibrating pen 3 driven by a display driving circuit 10. Such a display can be observed through the vibration transmission plate 8 (made of transparent material).

In this respect, as shown in FIG. 2, the vibrator 4 incorporated in the vibrating pen 3 is driven by the vibrator driving circuit 2. The driving signals for the vibrator 4 are supplied from the operation control circuit 1 as low level pulse signals, and subsequent to having been amplified by the vibrator driving circuit 2 with a given gain, the driving signals are applied to the vibrator 4.

The electrical driving signals are transduced by the vibrator 4 into mechanical ultrasonic vibration and are transmitted to the vibration transmission plate 8 through the tip 5 of the pen.

Description of the Operation Control Circuit

In the above-mentioned structure, the operation control circuit 1 outputs and signals which drive the vibrator 4 to the vibrator driving circuit 2 and the vibrating pen 3 per given cycle (per 5 ms, for example) and at the same time, causes its inner timer (comprising a counter) to start clocking. Then, the vibration generated by the vibrating pen 3 arrives at the vibratory sensors 6a to 6d with delays depending on the distances therebetween.

The vibration waveform detection circuit 9 detects signals from each of the vibratory sensors 6a to 6d and generates the signals which represent the vibration arrival timing to each of the vibration sensors by the waveform detection processing which will be described later. The operation control circuit 1 inputs the signals per sensor to detect the vibration arrival time to each of the vibration sensors 6a to 6d and calculates the coordinate positions of the vibrating pen.

Also, the operation control circuit 1 drives the display driving circuit 10 on the basis of the positional information of the vibrating pen 3 which has been calculated to control displaying by the display 11 or output the coordinate to external equipment (not shown) by means of serial or parallel communications.

Figure 19:
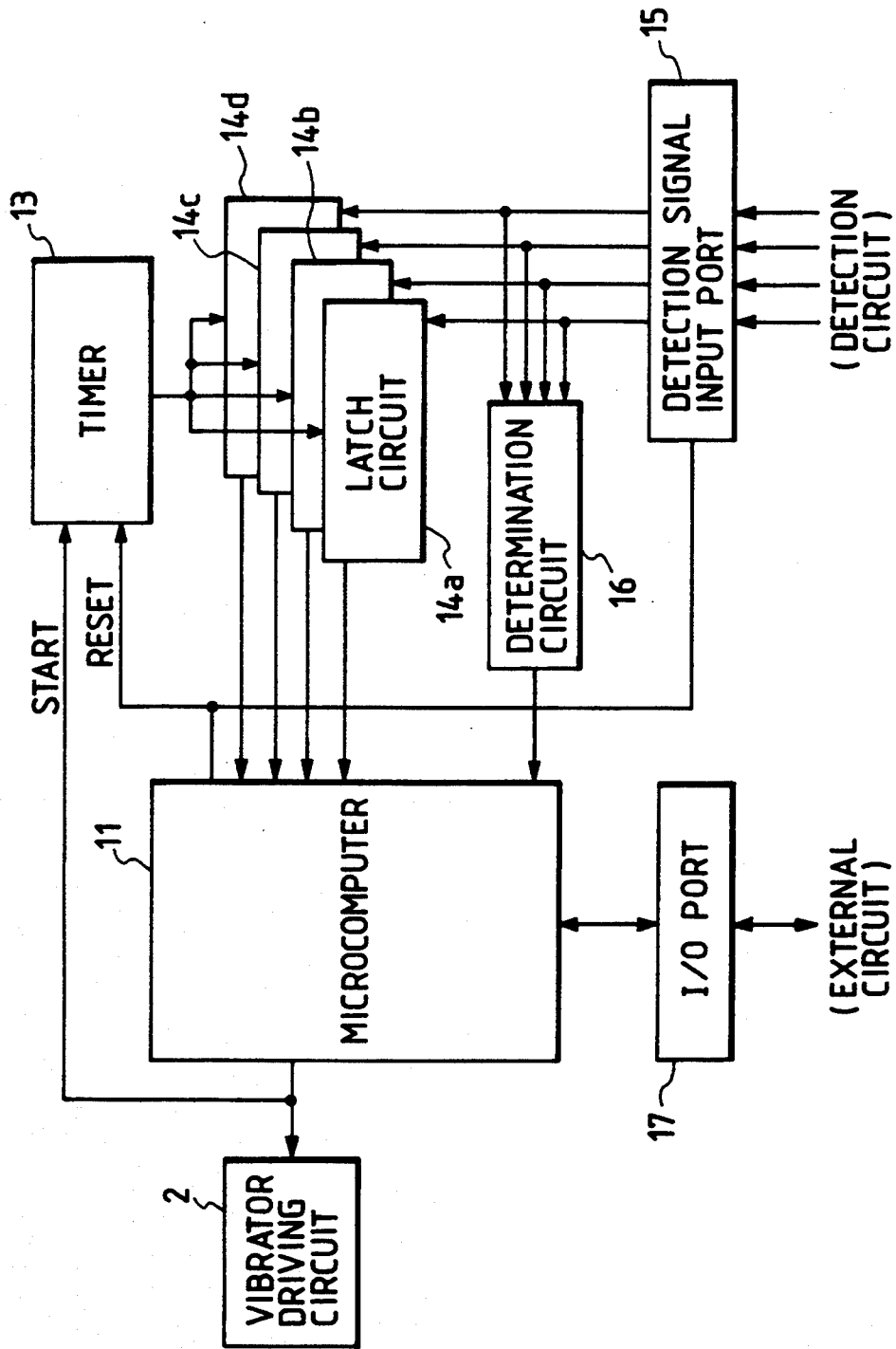
FIG. 19 is a view schematically showing an inner structure of an operation control circuit according to the third embodiment.

FIG. 19 is a block diagram schematically showing the structure of the operation control circuit 1 according to the present embodiment. Each constituent and the outline of its operation will be set forth below.

In FIG. 19, a reference numeral 11 designates the operation control circuit 1 and a microcomputer for controlling the entire system of the coordinate inputting apparatus embodying the present invention, which comprises an inner counter, a ROM for storing the operational procedures, a RAM used for calculation and others, and a non-volatile memory and others for storing constant and the like.

A reference numeral 13 designates a timer (comprising a counter, for example) measuring the standard clocking which is not shown and starts its clocking when the starting signal is inputted into the vibrator driving circuit 2 to start driving the vibrator 4 in the vibrating pen 3. By this, the start of the clocking is synchronized with the detection of vibrations by the sensors, thus making it possible to measure the delay times until the vibrations are detected by the sensors (6a to 6d).

The vibration arrival timing signal of each of the vibration sensors 6a to 6d output from the signal waveform detection circuit 9 is inputted into latch circuits 14a to 14d through the detection signal input port 15.

Each of the latch circuits 14a to 14d is related to each of the vibration sensors 6a to 6d, and when receiving timing signals from the related sensors, they will latch the timing value of the timer 13. Thus, the determination circuit 16, having determined that all the detection signals are received, outputs a signal to the microcomputer 11 to indicate the situation accordingly.

Having received this signal from the determination circuit 16, the microcomputer 11 reads from the latch circuits the vibration arrival times from the latch circuits 14a to 14d to each of the vibration sensors, and executes given calculations to calculate the coordinate positions of the vibrating pen 3 on the vibration transmitting diaphragm 8.

Then, the calculated coordinate positional information is output to the display driving circuit 10 through the I/O port 17, thus displaying dots or the like at the corresponding positions on the display 11, for example, or the coordinate positional information is output to an interface circuit through the I/O port 17 thereby to output the coordinate values to the external equipment.

Figure 20:
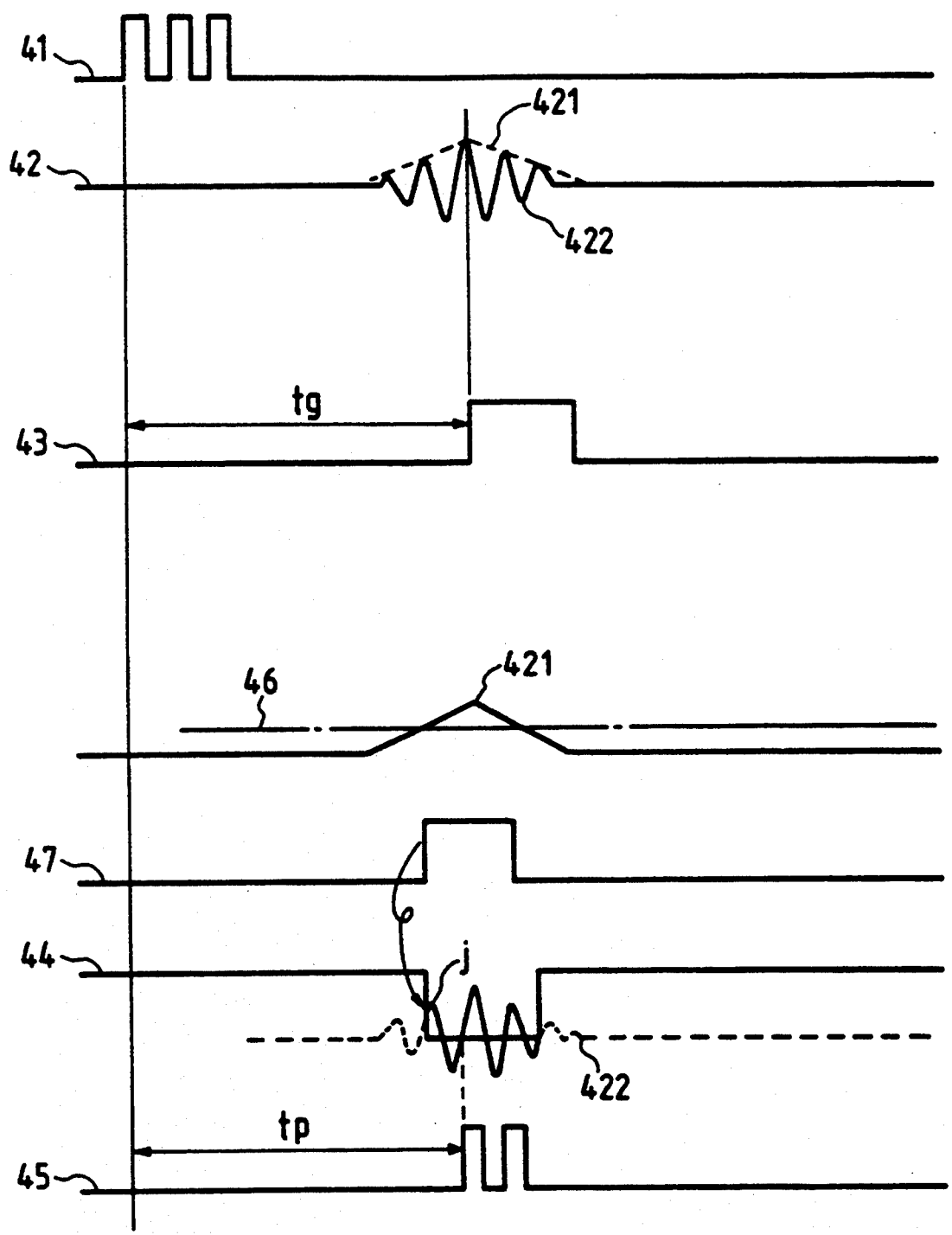
FIG. 20 is a timing chart for signal processing.
Figure 21:
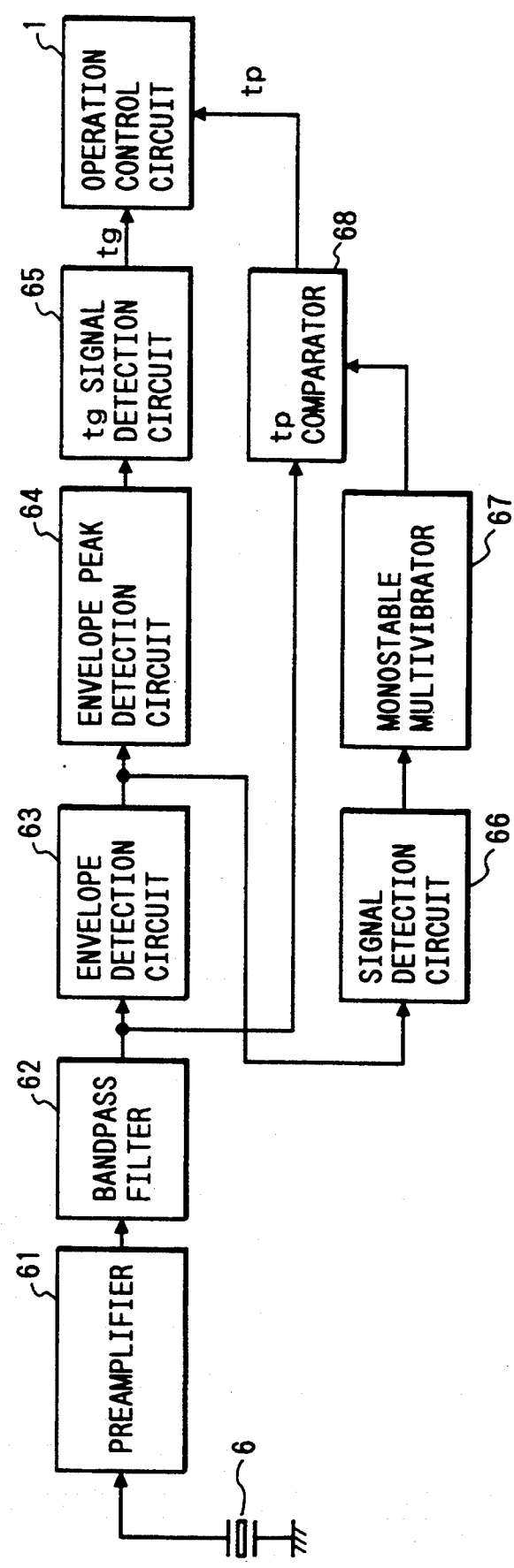
FIG. 21 is a block diagram showing a signal waveform detection circuit.

Description of Vibration Propagating Time Detections (FIG. 20 and FIG. 21)

Hereinafter, a description will be provided of the principle of the measurement of vibration arrival times at the vibration sensors 6.

FIG. 20 is a view illustrating the detection waveforms inputted into the signal waveform detection circuit 9 and the measurement processes for the vibration transmitting times on the basis of such waveforms. In this respect, a description will be provided of a case related to the vibration sensor 6a. It is to be understood that the same will be applicable to the other vibration sensors 6b, 6c, and 6d exactly.

It has already been explained that the measurement of vibration transmitting time to the vibration sensor 6a is started at the same time that the starting signal is output to the vibrator driving circuit 2. At this juncture, the driving signal 41 is being applied to the vibrator 4 from the vibrator driving circuit 2. With this signal 41, the ultrasonic vibration transmitted to the vibration transmitting diaphragm 8 from the vibrating pen 3 is detected by the vibration sensor 6a after they have advanced while taking a time tg corresponding to the distance to the vibratory sensor 6a. The signal at 42 in FIG. 20 shows the signal waveform detected by the vibration sensor 6a.

Since the vibrations used for the present embodiment are of lamb waves, the relation between the envelope 421 the phase 422 of the detection waveform relative to the propagation distance in the vibrating transmission plate 8 varies during the transmission of the vibrations in accordance with its transmitting distance. Here, the advancing velocity of the envelope 421, that is, the group velocity, is given as Vg while the phase velocity of the phase 422, as Vp. The distance between the vibrating pen 3 and the vibration sensor 6a can be detected in accordance with this group velocity Vg and phase velocity Vp.

Now, the attention is given only to the envelope 421 at first. Its velocity is Vg, and if a point on a specific waveform such as an inflection point or the peak at 43 in FIG. 20 is detected, the distance between the vibrating pen 3 and the vibration sensor 6a will be defined by the following equation where tg is its vibration transmitting time:

$$d = Vg \cdot tg \qquad (28)$$

This equation is for one of the vibration sensors 6a, but the distance between the vibrating pen 3 and each of the other three vibratory sensors 6b to 6d can also be represented by the application of the same equation.

Further, in order to determine coordinate with a higher precision, the process will be given on the basis of the phase signal detection. Now, given a specific detection point on the phase waveform signal 422, such as a time arriving at a zero cross point after a certain predetermined signal level 46, as Tp 45 (which can be obtained by generating a window signal 44 having a specific width with respect to the signal 47 and comparing it with the phase signal 422), the distance between the vibration sensor and the vibrating pen will be given by the following equation:

$$d = V_p \cdot T_p + n \cdot \lambda_p \quad (29)$$

where λp is wavelength of an elastic wave and n is an integer.

From the equations (28) and (29), the above-mentioned integer n can be expressed by the following equation:

$$n = \text{int}[(V_g \cdot T_g - V_p \cdot T_p)/\lambda P + 1/N] \quad (30)$$

Here, N is a real number other than zero, and any appropriate number can be used. For example, if N=2, an n can be defined, provided that the variations of tg and others are within ±½ wavelength. Now, by assigning an n thus obtained as above to the equation (30), it is possible to measure the distance between the vibrating pen 3 and vibration sensor 6a with a desirable precision. The generations of the signals 43 and 45 for the measurements of the above-mentioned two vibration transmitting times tg and tp are executed by a vibration waveform detection circuit 9. This vibration waveform detection circuit 9 is structured as shown in FIG. 21.

Figure 29:
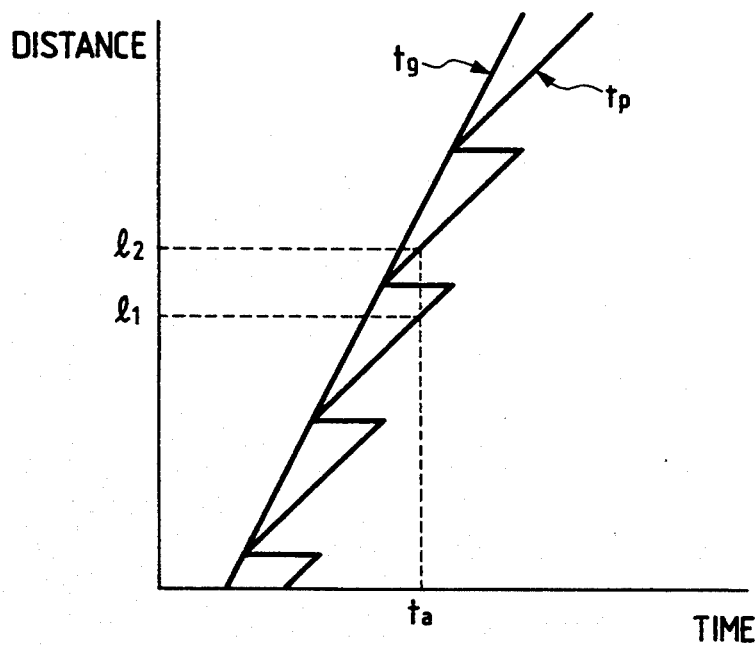
FIG. 29 is a graph showing the relationship between the propagation time and the propagation distance using the group velocity and the phase velocity as parameters.
Figure 24A:
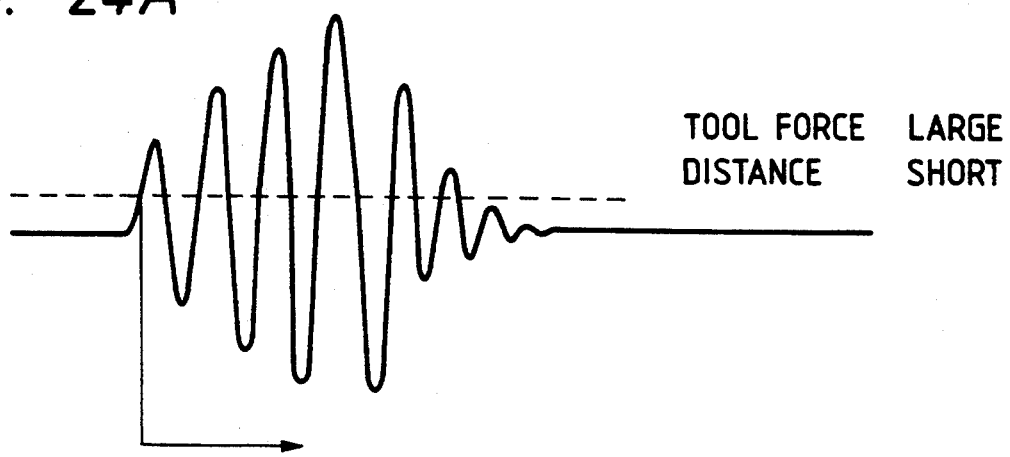
FIGS. 24A to 24C are views for explaining the relations between delay times and levels of signal waveforms.
Figure 24B:
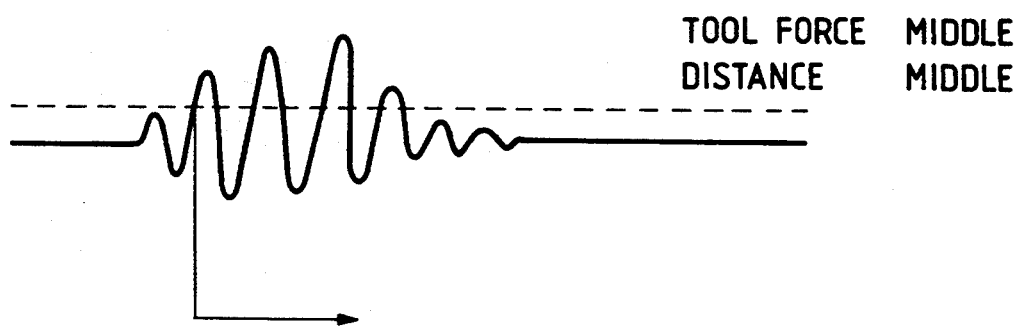
Figure 24C:
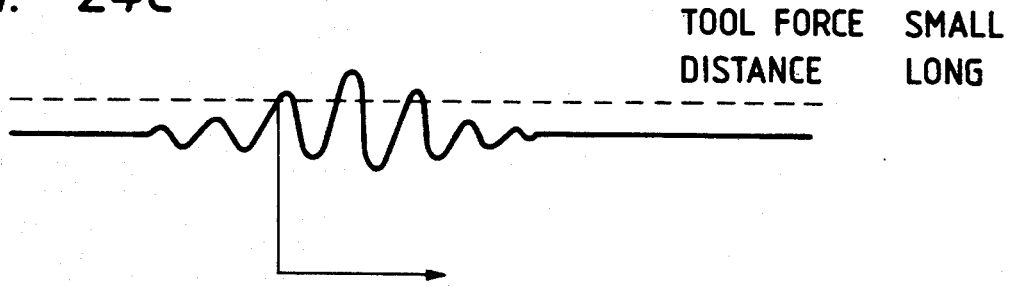
Figure 25:
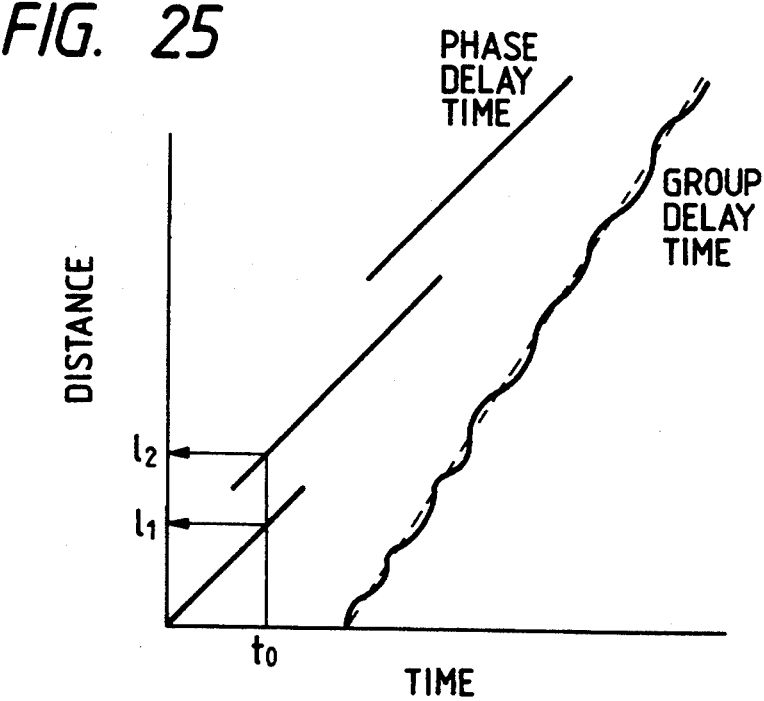
FIG. 25 is a view for explaining phase delay time and group delay time of a Lamb wave relative to various distances.

FIG. 21 is a block diagram showing the structure of the vibration waveform detection circuit 9 according to the third embodiment, while FIGS. 24A, 24B, and 24C show the relation between the delay time and the levels of the signal waveform, FIG. 25 explains the phase delay time and group delay time of a Lamb wave relative to various distances, and FIG. 29 shows the relationship between the propagation time and the propagation distance using the group and phase velocities as parameters.

In FIG. 21, the output signals of the vibration sensor 6a are amplified by a preamplifier 61 to a given level. The excessive frequency components of the amplified signals are removed by a band pass filter 62 and are inputted into an envelope detection circuit 63 comprising an absolute value circuit, a low band pass filter, and others, for example. Thus, the envelopes of a detection signal are drawn. The timing of envelope peak is detected by an envelope peak detection circuit 64. Then, the signal tg (signal 43 in FIG. 20), which is the envelope delay detection signal having a given waveform is produced by a tg signal detection circuit 65 comprising a mono vibrator and others on the basis of the envelopes detected by the peak detection circuit, is inputted into the operation control circuit 1.

Meanwhile, a reference numeral 66 designates a signal detection circuit which forms pulse signals 47 for the portion exceeding a threshold signal 46 of a given level in the envelope signal 421 detected by the envelope detection circuit 63; 67 denotes a monostable multivibrator to open the gate signal 44 of a given time width triggered by the initial rise of the pulse signals 47; and 68 denotes a Tp comparator to detect the zero cross point of the initially rising phase signal 422 during the period the gate signal 44 is open thereby to supply the phase delay time signal tp 45 to the operation control circuit 1. In this respect, the circuits described above are for the vibration sensor 6a, but the same circuit is provided for each of the other vibration sensors.

Description of Circuit Delay Time Correction

The vibration transmitting time latched by the aforesaid latch circuit includes a circuit delay time et and a phase offset time (toff). In these delay times, not only the electrical delay time for circuits, but also the fixed physical delay time in the passage from driving to detection. The errors generated in these aspects involve the same amounts invariably when vibration is transmitted from the vibrating pen 3 to the vibration transmission plate 8 and then to the vibration sensors 6a to 6d.

Figure 22:
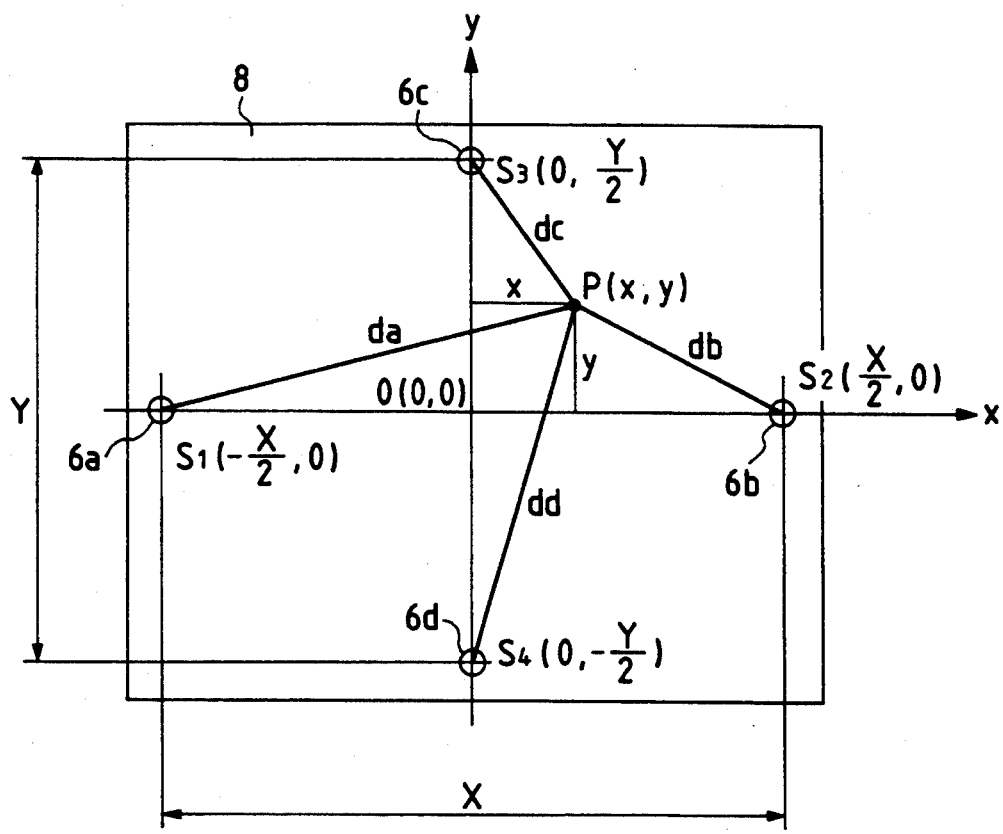
FIG. 22 is a view showing a coordinate system of a coordinate system inputting apparatus.

Therefore, if, for example, the distance from the position of the origin 0 in FIG. 22 to the sensor 6a, for example, is given as R1 (=x/2), the vibration transmitting times actually measured to the sensor 6a from the origin 0 which is actually measured by performing input by the vibrating pen 3 at the origin 0 are given as tgz' and tpz', and also, the real transmitting times from the origin 0 to the sensor as tgz and tpz, these will have the following relation with respect to the circuit delay time et and phase offset (toff):

$$tgz' = tgz + et \quad (31)$$

$$tpz' = tpz + et + toff \quad (32)$$

On the other hand, the actual measurement values tg' and tp' at point P of optionally inputted points will be likewise:

$$tg' = tg + et \quad (33)$$

$$tp' = tp + et + toff \quad (34)$$

When the difference between both of them, (31), (32), and (33), (34), is obtained in the following manner:

$$tg' - tgz' = (tg + et) - (tgz + et) = tg - tgz \quad (35)$$

$$tp' - tpz' = (tp + et + toff) - (tpz + et + toff) \quad (36)$$
$$= tp - tpz$$

The inherent delay time et included in each of the transmitting times and the phase offset toff are removed. It is thus possible to obtain the difference between the real transmitting delay times depending on the distance originated from the position of the sensor 6a between the position of origin 0 and the inputted points, hence enabling the difference in distances to be obtained using the aforesaid equations (29) and (30).

Since the distance from the vibration sensor 6a to the origin 0 is stored in the non-volatile memory in advance and is known, the distance between the vibrating pen 3 and the vibration sensor 6a can be determined. It is also possible to obtain such distance for each of the other sensors 6b to 6d in the same manner.

The above-mentioned actual measurement values tgz' and tpz' at the origin 0 are stored in the non-volatile memory at the time of delivery, and the equations (35) and (36) are performed prior to the calculation to be operated by the equations (29) and (30), thus making it possible to execute a highly precise measurement.

Description of the Coordinate Position Calculation
(FIG. 22)

Subsequently, a description will be provided of the principle of the detection of the coordinate positions on a vibration transmission plate 8 actually by a vibrating pen 3.

Now, in the vicinity of the central point on each of the four sides of the vibration transmission plate 8, each of the four vibration sensors 6a to 6d is arranged at the positions designated by reference marks S1 to S4, respectively. Then, it is possible to obtain the straight distances da to dd from the position P of the vibrating pen 3 to the positions of the sensors 6a to 6d. Moreover, in the operation control circuit 1, the coordinates (x, y) of the position P of the vibrating pen 3 can be obtained by the following equation in accordance with the straight distances da to dd applying the theorem of three squares:

$$x = (da+db) \cdot (da-db)/2X \quad (37)$$

$$y = (dc+dd) \cdot (dc-dd)/2Y \quad (38)$$

where X is the distance between the vibration sensors 6a and 6b and Y is the distance between the vibration sensors 6c and 6d.

As set forth above, the positional coordinate of the vibrating pen 3 can be detected in real time. Thus, by the sensors a and b, the x coordinate and by the sensors c and d, the y coordinate are respectively calculated independently.

Now, provided that the distance between the pen and sensor calculated by the equation (30) is correct, the following equations will be established:

$$Da^2 - (X/2+x)^2 - y^2 \leq Eth \quad (39)$$

$$Dc^2 - (Y/2+y)^2 - x^2 \leq Eth \quad (40)$$

where
Da: the distance between pen and sensor 6a
Dc: the distance between pen and sensor 6c
Eth: determined threshold value
and in this case, the determined threshold value Eth is theoretically zero.

When there is a wavelength error in a certain distance between the pen and a sensor due to an inclination of the pen, the relations expressed by the above-mentioned equations (39) and (40) cannot be maintained. Thus, a value following such a error will be given to the left-hand side thereof. This is because of the fact that each of the coordinate values is calculated independently. Using this characteristic, it is possible to determine the presence of wavelength error by examining whether the equations (39) and (40) are satisfied or not while defining Eth to be a value which should be lower than the one at the time of a wavelength error generated in consideration of the other errors that may take place in practice.

Also, using this determination technique, it may be possible to correct any wavelength errors.

Now, limiting the distance error for the output of each of the sensors to one wavelength, a description will be provided of the cases where the n in the equation (29) is n, n+1.

For the distance output of each of the sensors, the error combinations of n, n+1 can be prepared for 16 sorts including correct one (where all the outputs are n). With respect to the 15 combinations including errors, the length equivalent to one wavelength portion is subtracted sequentially from the output distances to calculate coordinates and examine errors. Then, the correct combinations are determined.

In other words, for each of the distances between the sensors and the pen Da, Db, Dc, and Dd, coefficients A, B, C, and D are defined as 15 sorts given below.

$$[A, B, C, D] = [1, 0, 0, 0] \quad (41)$$
[0, 1, 0, 0]
[1, 1, 0, 0]
[0, 0, 1, 0]
[1, 0, 1, 0]
[0, 1, 1, 0]
[1, 1, 1, 0]
[0, 0, 0, 1]
[1, 0, 0, 1]
[0, 1, 0, 1]
[1, 1, 0, 1]
[0, 0, 1, 1]
[1, 0, 1, 1]
[0, 1, 1, 1]
[1, 1, 1, 1]

Now, using this [A, B, C, D] (hereinafter referred to as correction coefficient), the distance correction is made by the following equations to calculate coordinate, and calculations will be repeated for all the above-mentioned combinations until succeeding in the error examination.

$$Da = Da - (A * \lambda) \quad (42)$$

$$Db = Db - (B * \lambda) \quad (43)$$

$$Dc = Dc - (C * \lambda) \quad (44)$$

$$Dd = Dd - (D * \lambda) \quad (45)$$

where λ: wavelength of vibration

The coordinate values of the combination which have passed the examinations by the equations (39) and (40) subsequent to the corrections by the equations (42) to (45) are correct coordinate values.

Figure 23:
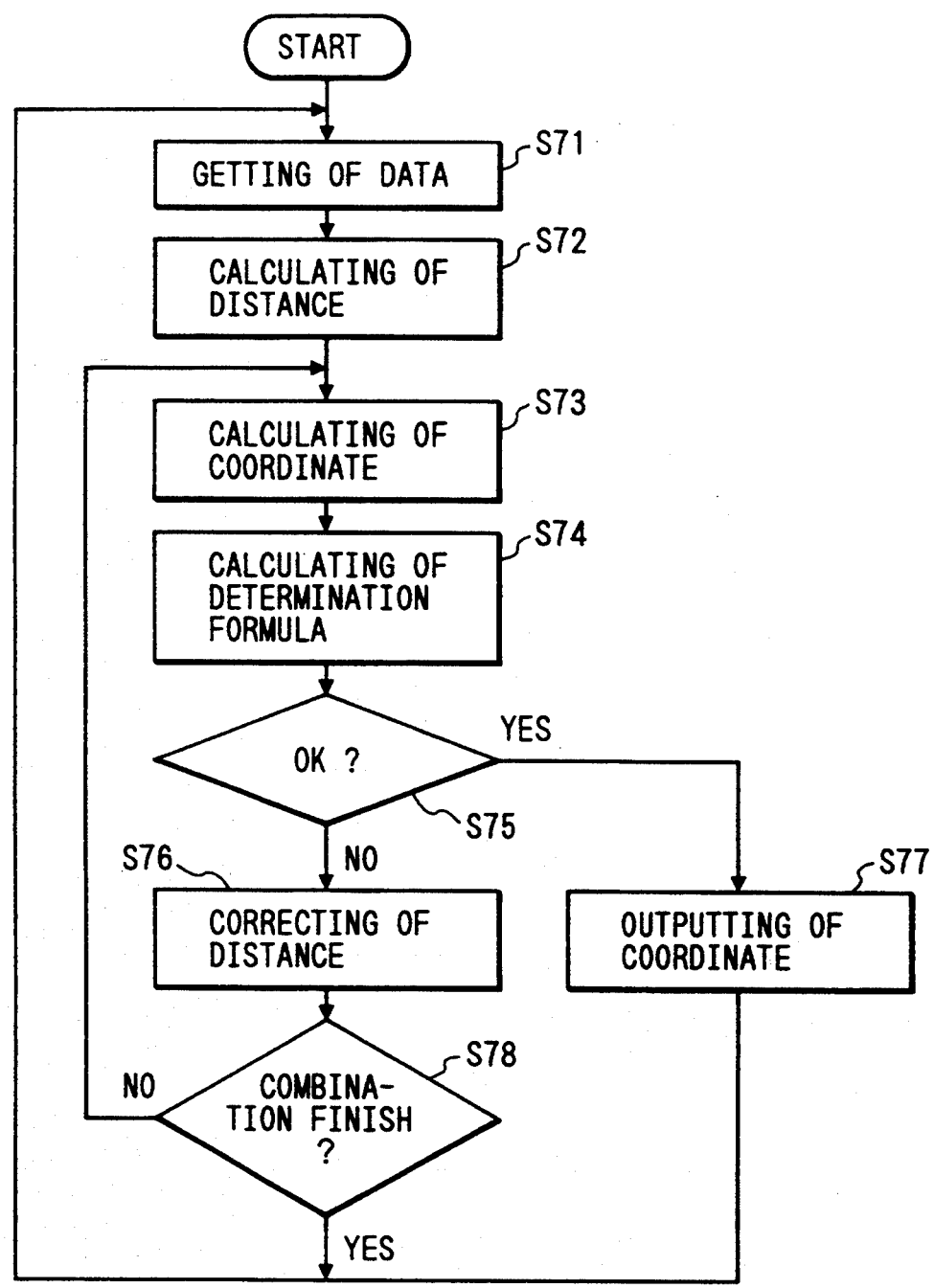
FIG. 23 is a flowchart showing correction procedures.

FIG. 23 is a flowchart showing the processing procedures executed by the operation control circuit 1 when the above-mentioned error detections and correction processes are performed.

At first, coordinate is indicated by an operator using a pen 3. Then, the vibration is detected by sensors 6 to obtain transmission delay times as original data (S71).

Subsequent to having performed the distance calculations including the n calculation equation (30) on the basis of the original data (S72), the coordinate of the pen 3 is calculated (S73). This first coordinate calculation is the one performed with the data obtained in the step S71 as they are.

For the calculated coordinate values, error examination is conducted using the above-mentioned equations (39) and (40) (S74). If the results of the examination are acceptable, such coordinate is output (S75→S77), and the process will proceed to obtain the next coordinate point data.

If the results of the examination are not acceptable, the distance correction will be made by the equations (42) to (45) following the sequence of the above-mentioned (41) (S75→S76→S78→S73). In this case, if the results are still unacceptable even when all the combinations have been examined (the examinations have been completed up to [1,1,1,1]), it is determined that correction is impossible and the process will proceed to obtain the next data without performing any coordinate output (S78 - YES).

In this way, the distance correction, coordinate calculation, and error examination are repeated until the results of the examination become acceptable or the completion of the combinations.

By executing the processes following the flowchart described above, the distance corrections are made on the basis of the results of the error examinations, thus making it possible to execute the highly precise coordinate outputs without omission of any coordinate rows.

The above description has been made for only one wavelength error, but it is not limited thereto. What is described is further applicable to a plurality of wavelength errors. In such a case, the correction, coordinate calculation, and examination are executed in the same manner as above after the number of combinations have been increased. If, for example, errors for two wavelength portions, n, n+1, and n+2, are to be corrected, the combinations of the correction coefficient [A, B, C, D] should be produced with {0, 1, 2} as an element but not only {0, 1}. Accordingly, the combinations tried at the time of examination are increased from $2^4-1=15$ to $3^4-1=80$. Thus, there will be less cases where corrections are impossible in conclusion, and the possibility that coordinate rows are omitted can be reduced further.

Also, in a third embodiment, while the description has been provided of the asymmetrical wave of a lamb wave, it is not confined thereto, and the present embodiment is applicable to an apparatus capable of calculating coordinates with a plurality of fiducial distances provided.

In the above-mentioned third embodiment, the sequence in which the distance corrections are executed is predetermined by the correction coefficients (41). However, if means for rearranging the orders of the combinations is provided, it is possible to shorten the time required for completing the corrections.

The n obtained by the equation (30) is used after it has been made an integer. Now, given the difference between a value before it is made an integer and the value after it has been made an integer as $\Delta n$, it will be:

$$\Delta n = n - \text{int}(n) \tag{46}$$

This $\Delta n$ takes a value within a range of $\pm 0.5$, and if it exceeds $\pm 0.5$, a wavelength error will be generated.

In a case where the determination range of the n is defined for n, n+1 as described above, the value of $\Delta n$ will exceed $+0.5$ if there occurs any wavelength error.

Also, given $\Delta n$ as $-0.5+\alpha$ and the value of the $\alpha$ as 0 to $+0.5$, there will a higher probability that the value of $\Delta n$ is negative for the distance data having wavelength error equivalent to + one wavelength portion.

When the correction coefficients (41) are used sequentially, the corrections are executed for +one wavelength portion one by one in order of A, B, C, and D. Now, therefore, by rearranging the $\Delta n$ of the coefficients A to D used for the equations (42) to (45) to be in order of its smaller value, it becomes possible to find the combinations which can pass the examinations more quickly thereby to reduce the number of repetitions required for the completion of the examinations, hence implementing the reduction of the operation time.

Now, assuming that the relations between $\Delta n$s themselves for the distances from the pen to the sensors $6a$ to $6d$ when they are calculated independently are:

$$\Delta nb < \Delta nd < \Delta na < \Delta nc \tag{47}$$

where $\Delta ni$ is $\Delta n$ at sensor i, the equations (42) to (45) will have its coefficients rearranged as follows:

$$Da = Da - (C * \lambda) \tag{48}$$

$$Db = Db - (A * \lambda) \tag{49}$$

$$Dc = Dc - (D * \lambda) \tag{50}$$

$$Dd = Dd - (B * \lambda) \tag{51}$$

Thereafter, the correction and examination should only be executed as described earlier.

In the above-mentioned example, the rearrangement of each coefficient has been made, but it is possible to obtain the same effect by rearranging the sequence of each sort of the correction coefficients (41).

Also, the present embodiment is an example in which the attention is given to $\Delta n$ for the rearrangement of the correction coefficients, but it may be possible to make the rearrangement in accordance with signal levels or other references. As described above, by making the distance corrections on the basis of the results of the examinations regarding the presence of errors, the wavelength errors generated due to the inclination of the pen or the like can be corrected. Hence, it becomes possible to perform stable and highly precise coordinate outputs without any omission of coordinate rows irrespective of the above-mentioned inclination of the pen, rebounding of the vibrations at the end portions or various other variations.

Figure 26:
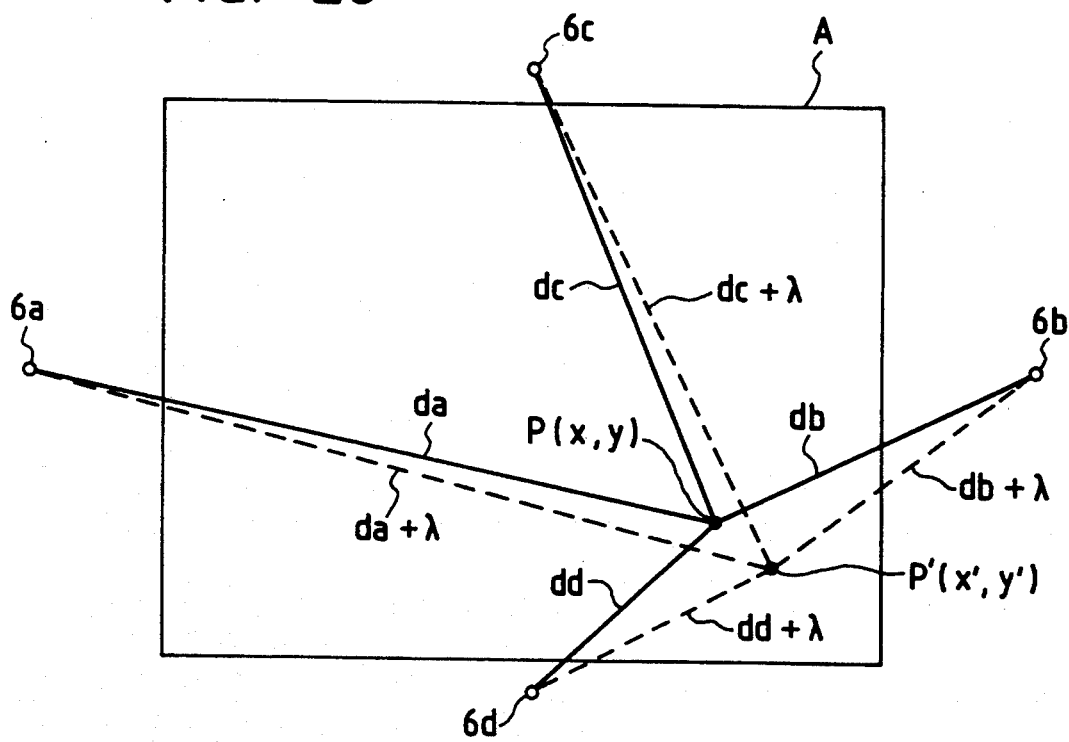
FIG. 26 is a view for explaining points at which judgments are disabled.

In a coordinate inputting apparatus according to the third embodiment, if the relation between the sensors and the effective area is not established appropriately, there may be some cases where the examinations become disabled in the above-mentioned criterional equations (39) and (40) even when wavelength errors take place actually. FIG. 26 is a view showing an example of such a case.

When the distance outputs da and dc of the sensors $6a$ and $6c$ have errors of wavelength $\lambda$ 10 respectively and the coordinates (x, y) originally at P have been calculated as P' (x', y') due to such wavelength errors, the result of this calculation is accepted by the above-mentioned criterional equations (39) and (40) if the relation between the effective area A and the sensor positions is not appropriate irrespective of the actual occurrence of the wavelength errors. As a result, the erroneous coordinate is output. Fundamentally, in a correct coordinate P (x, y), the left-hand side of the equation (39) is zero, and is expressed as follows:

$$Da^2 - (X/2 + x)^2 - y^2 = 0 \tag{52}$$

To the equation (40), the same is also applicable:

$$Dc^2 - (Y/2 + y)^2 - x^2 = 0 \tag{53}$$

The point where the examination is disabled also satisfies the equations (52) and (53) as regards P' (x', y'). Therefore, such point is regulated by the following equations (54) and (55):

$$(x'^2 + y'^2) - (x^2 + y^2) = (x' - x)X \tag{54}$$

$$(x'^2 + y'^2) - (x^2 + y^2) = (y' - y)Y \tag{55}$$

Here, the x' and y' are the coordinate values calculated from the distances including wavelength errors and the x and y are the fundamentally correct coordinate values. The X and Y are the distances between the sensors which determine each of the coordinates. The equations (54) and (55) express the conditions under which the equations (39) and (40) are satisfied when the distances between the coordinates deviated due to the wavelength errors and the fundamentally correct coordinates are equal to the product of the distances between the sensors used for the coordinate calculation and the difference between the correct and erroneous coordinates.

In consideration of the examination values Eth used for the criterional equations, the examination disabled area will be at the following coordinate positions:

$$-Eth < (x'^2+y'^2)-(x^2+y^2)-(x'-x).X < Eth \quad (56)$$

$$-Eth < (x'^2+y'^2)-(x^2+y^2)-(y'-y).Y < Eth \quad (57)$$

Figure 27:
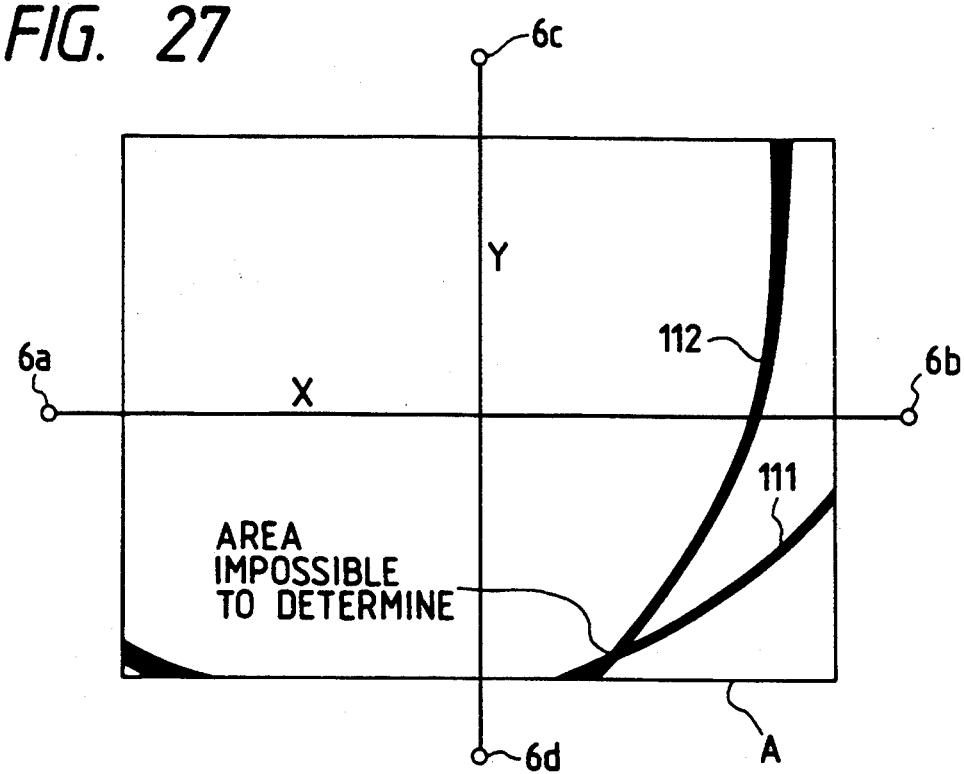
FIG. 27 is a view for explaining an area in which judgments are disabled.

If the threshold value Eth becomes greater, its area will also become greater as a matter of course. Reference numerals 111 and 112 in FIG. 27 designate the coordinate areas where the equations (56) and (57) are respectively satisfied when they take Eth values appropriately and then the point where they intersect constitutes the area where the examination is disabled.

In order to avoid any creation of such an area in the effective area, the sensor position is determined in accordance with the equations (56) and (57) so that the examination disabled area is located outside the effective area and then the X and Y are defined.

Figure 28:
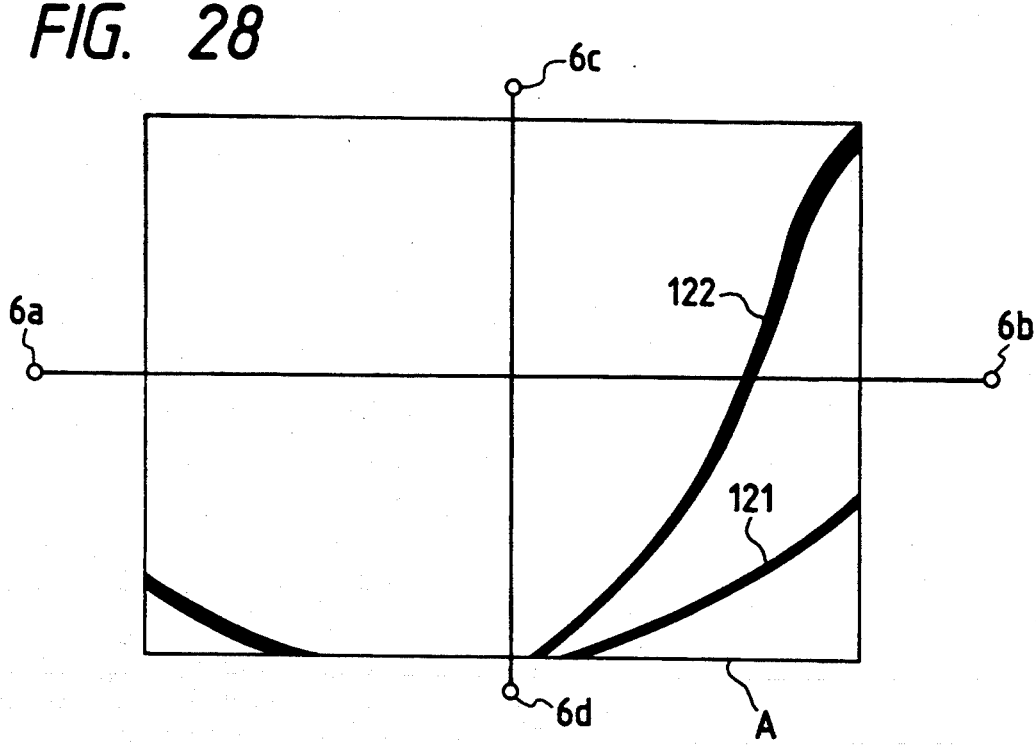
FIG. 28 is a view for explaining removal of a judgment disabled area from an effective area for coordinate input.

FIG. 28 is a view showing an examination disabled area when the distances between the sensors are modified in accordance with the equations (54) and (55). The intersecting point at 121 and 122 is now outside the effective area. As a result, the examination is possible over the entire area. In this case, the countermeasure is taken by making the X longer and the Y shorter, but if the sensor positions are regulated, it may be possible to cope with the situation by modifying the effective area.

As described above, it becomes possible to calculate coordinates accurately in the entire effective area by arranging the sensors so that the error examination disabled area, which is regulated by the distances from the correct coordinate positions generated by the wavelength errors as well as by the distances between sensors, can be formed outside the effective area in which to execute inputs.

In this respect, the present invention is not only applicable to a system comprising a plurality of equipment but also to an apparatus comprising a single piece of equipment. Also, the present invention will, of course, be applicable to a system or an apparatus which becomes operative by providing a program.

As set forth above, a coordinate inputting apparatus of the third embodiment according to the 10 present invention has an effect that while controlling the generations of the wavelength errors, it will not reduce useability in operation.

What is claimed is:

1. An apparatus for correcting a coordinate of a position specified by a vibration inputting means of a coordinate inputting apparatus for generating Lamb waves with the vibration inputting means, for specifying a desired position on a coordinate input member to energize the coordinate input member, for detecting the Lamb waves with detection means fixed at a given position on the coordinate input member, and for calculating the distance between the position specified by the vibration inputting means and the detection means in accordance with a propagation delay time of the group velocity of the Lamb wave and a propagation delay time of the phase velocity of the Lamb wave and in accordance with a number N for correcting a difference between the propagation delay time of the group velocity and the propagation delay time of the phase velocity, thereby calculating on the basis thereof a coordinate of the position specified by the vibration inputting means, said apparatus comprising:

integer formulation means for making N an integer;
   calculation means for calculating a difference between a value of N before the integer formulation and a value of N after the integer formulation by said integer formulation means; and
   correction means for correcting errors due to said integer formulation using said difference.

2. An apparatus for correcting a coordinate of a position specified by a vibration inputting means of a coordinate inputting apparatus for generating Lamb waves with the vibration inputting means, for specifying a desired position on a coordinate input member to energize the coordinate input member, for detecting the Lamb waves with detection means fixed at a given position on the coordinate input member, and for calculating the distance between the position specified by the vibration inputting means and the detection means in accordance with a propagation delay time of the group velocity of the Lamb wave and a propagation delay time of the phase velocity of the Lamb wave and in accordance with a number N for correcting a difference between the propagation delay time of the group velocity and the propagation delay time of the phase velocity, thereby calculating on the basis thereof a coordinate of the position specified by the vibration inputting means, said apparatus comprising:

integer formulation means for making N an integer;
   decision means for deciding whether the error generated at the time of the integer formulation by said integer formulation means is within a given range; and
   determination means for nullifying the position specified by the vibration inputting means if the error generated at the time of said integer formulation is decided by said deviation means not to be within the given range.

3. A coordinate position correcting apparatus for a coordinate inputting apparatus in which a plurality of vibration detection means are arranged on a coordinate input member for propagating vibration to measure on the basis of vibration arrival times the respective distances between vibration inputting means for generating vibration and the vibration detection means, and in which the point indicated by the vibration inputting means on the coordinate input member is output by calculation as a coordinate value, comprising:

setting means for setting in advance the coordinate to be inputted by the vibration inputting means;
   correction coefficient calculation means for calculating a correction coefficient as a ratio of the coordinate set by said setting means to the coordinate output by calculation; and
   coordinate correction means for correcting the coordinate output by calculation, on the basis of the correction coefficient calculated by said correction coefficient calculation means.

4. A coordinate position correcting apparatus according to Claim 3, wherein
   said correction coefficient calculation means performs a vibration input operation with said vibration inputting means on the coordinate set by said setting means and as a result thereof, said correction coefficient calculation means calculates a ratio of said coordinates output by calculation and said set coordinates as the correction coefficient.

5. A coordinate position correcting apparatus according to Claim 4, wherein
said correction coefficient calculation means calculates the ratio of the coordinates output by calculation and the set coordinates at plural positions and makes a mean value of the ratios the correction coefficient.

6. A correcting apparatus for an inputted coordinate, comprising:
a vibration transmission member for transmitting vibration;
vibration inputting means for inputting vibration into said vibration transmission member;
detection means for detecting the a vibration on said vibration transmission member;
coordinate calculation means for calculating a coordinate on the vibration transmission member inputted by said vibration inputting means on the basis of a vibration delay time detected by said detection means;
setting means for setting in advance the coordinate on said vibration transmission member to be inputted by said vibration inputting means; and
correction coefficient calculation means for calculating a correction coefficient as a ratio of the coordinate set by said setting means to the coordinate calculated by said coordinate calculation means; and
coordinate correction means for correcting the coordinate calculated by said coordinate calculation means, on the basis of the correction coefficient calculated by said correction coefficient calculation means.

7. A correcting apparatus for inputted coordinates according to Claim 6, wherein
said correction coefficient calculation means performs a vibration input operation with said vibration inputting means on the coordinate set by said setting means and as a result thereof, said correction coefficient calculation means calculates a ratio of the calculated coordinates obtained by said coordinate calculation means and said set coordinates as the correction coefficient.

8. A correcting apparatus for inputted coordinates according to Claim 7, wherein
said correction coefficient calculation means calculates the ratio of the calculated coordinates obtained by said coordinate calculation means and the set coordinates at plural position and makes a mean value of the ratios the correction coefficient.

9. A correction method for an inputted coordinate, comprising the steps of:
(1) inputting vibration into a vibration transmission member;
(2) detecting the vibration of said vibration transmission member;
(3) calculating a coordinate on the vibration transmission member inputted in said step (1) on the basis of a vibration delay time detected in said step (2);
(4) setting in advance the coordinate to be inputted in said step (1); and
(5) calculating a correction coefficient as a ratio of the coordinate set in said step (4) to the coordinate calculated in step (3); and (6) correcting the coordinate calculated in said step (3), on the basis of the correction coefficient calculated in said step (5).

10. A correction method for an inputted coordinate according to Claim 9, wherein
said step (5) performs an input operation of inputting a vibration in said step (1) on the coordinate set in said step (4) and calculates as a result thereof a ratio of the calculated coordinate obtained in said step (3) and said set coordinate as a correction coefficient.

11. A correction method for an inputted coordinates according to Claim 10, wherein
said step (5) calculates said ratio of the calculated coordinate and the set coordinate at plural positions and makes a mean value of the ratios the correction coefficient.

12. A correction method for inputted coordinates according to Claim 11, wherein
the plural positions recited in said step (5) are two different points.

13. A coordinate inputting apparatus in which a plurality of vibration sensors are arranged on a coordinate inputting member for propagating vibration to measure each distance between a coordinate indicating device for generating vibration and each sensor on the basis of vibration arrival times, and in which the point indicated on said coordinate inputting member by said coordinate indicating device is output by calculation as the coordinate value, said apparatus comprising:
calculation means for calculating the coordinate on the basis of said distances;
determining means for determining the presence of wavelength errors from said calculated coordinate value and the measured distances; and
correction means for correcting the distances by incorporating each of predetermined correction values into each measured distance when said determining means determines the presence of wavelength errors,
wherein the coordinate calculation performed by said calculation means is repeated until the coordinates calculated on the basis of the distances corrected by said correction means are found by said determining means not to have any error.

14. A coordinate inputting apparatus according to Claim 13, wherein,
the error determined by said determining means is a quantumization error when a vibration wave number of a vibration is quantized, and wherein said correction means includes means for determining combinations to correct the distances in accordance with the value of said quantumization error.

15. A coordinate inputting apparatus according to Claim 13, further comprising means for stopping the outputting of a coordinate value if the number of the combinations for performing said correction is a given number.

16. A coordinate inputting apparatus according to Claim 13, wherein
the vibration sensors are arranged on the coordinate inputting member so that a decision disabled area where the coordinates calculated on the basis of the distance including the error are found not to have any error even when determined by said determining means, can be formed outside an effective input area.

* * * * *

UNITED STATES PATENT AND TRADEMARK OFFICE
CERTIFICATE OF CORRECTION

PATENT NO. : 5,420,804

DATED : May 30, 1995

INVENTOR(S) : Atsushi TANAKA, et al.

It is certified that error appears in the above-indentified patent and that said Letters Patent is hereby corrected as shown below:

COLUMN 2

Line 18, "therefore" should read --therefore,--.
Line 45, "a" should be deleted.

COLUMN 3

Line 52, "problem" should read --problem that--.

COLUMN 4

Line 29, "cyection." should read --correction.--.

COLUMN 8

Line 67, "a" should read --an--.

COLUMN 9

Line 1, "mncludes" should read --includes--.

COLUMN 10

Line 25, "$20," should read --S20,--.

UNITED STATES PATENT AND TRADEMARK OFFICE
CERTIFICATE OF CORRECTION

PATENT NO. : 5,420,804
DATED : May 30, 1995
INVENTOR(S) : Atsushi TANAKA, et al.

It is certified that error appears in the above-indentified patent and that said Letters Patent is hereby corrected as shown below:

COLUMN 12

Line 8, "Coordinate" should read --coordinate--.
Line 62, "$(t_1^2 - t_r^{26l})/2X_{RL},b$" should read $--(t_1^2 - t_r^2)/2X_{RL},b--$.

COLUMN 13

Line 11, "is" should read --it--.
Line 20, "$y/y' = 1/K$ (23)" should read $--y/y' = 1/K \quad \ldots (23)--$.

COLUMN 14

Line 36, "coordinates," should read --coordinate,--.

COLUMN 18

Line 33, "lamb" should read --Lamb--.

COLUMN 21

Line 37, "a error" should read --an error--.

UNITED STATES PATENT AND TRADEMARK OFFICE
CERTIFICATE OF CORRECTION

PATENT NO. : 5,420,804
DATED : May 30, 1995
INVENTOR(S) : Atsushi TANAKA, et al.

It is certified that error appears in the above-indentified patent and that said Letters Patent is hereby corrected as shown below:

COLUMN 22

Line 27, "vibration" should read --vibration.--.

COLUMN 23

Line 20, "lamb" should read --Lamb--.
Line 43, "An" should read --$\Delta$n--.
Line 44, "will" should read --will be--.
Line 45, "An" should read --$\Delta$n--.
Line 57, "Ans" should read --$\Delta$n's--.

COLUMN 24

Line 12, "An" should read --$\Delta$n--.--.
Line 34, "$\lambda$10" should read --$\lambda$--.

COLUMN 25

Line 48, "10" should be deleted.

UNITED STATES PATENT AND TRADEMARK OFFICE
CERTIFICATE OF CORRECTION

PATENT NO. : 5,420,804
DATED : May 30, 1995
INVENTOR(S) : Atsushi TANAKA, et al.

It is certified that error appears in the above-indentified patent and that said Letters Patent is hereby corrected as shown below:

COLUMN 28

Line 12, "coordinates" should read --coordinate--.
Line 47, "wherein," should read --wherein--.

Signed and Sealed this

Twenty-fourth Day of October, 1995

BRUCE LEHMAN

Attest:

Attesting Officer

Commissioner of Patents and Trademarks